(12) United States Patent
Parent

(10) Patent No.: US 7,117,268 B2
(45) Date of Patent: Oct. 3, 2006

(54) ARCHITECTURE FOR COMMUNICATING WITH ONE OR MORE ELECTRONIC DEVICES THROUGH A GATEWAY COMPUTER

(75) Inventor: Jesse L. Parent, Salt Lake City, UT (US)

(73) Assignee: Matsushita Electric Works, Ltd., Osaka (JP)

( * ) Notice: Subject to any disclaimer, the term of this patent is extended or adjusted under 35 U.S.C. 154(b) by 933 days.

(21) Appl. No.: 09/727,244

(22) Filed: Nov. 30, 2000

(65) Prior Publication Data

US 2002/0103927 A1    Aug. 1, 2002

(51) Int. Cl.
*G06F 15/16* (2006.01)

(52) U.S. Cl. ............... 709/238; 709/201; 709/203; 709/217; 709/246

(58) Field of Classification Search ........ 709/201–203, 709/217–219, 236–238, 246
See application file for complete search history.

(56) References Cited

U.S. PATENT DOCUMENTS

| | | | | |
|---|---|---|---|---|
| 5,805,442 A | | 9/1998 | Crater et al. ................ | 364/138 |
| 5,956,487 A | * | 9/1999 | Venkatraman et al. ...... | 709/218 |
| 5,975,737 A | | 11/1999 | Crater et al. ................ | 364/138 |
| 5,982,362 A | | 11/1999 | Crater et al. ................ | 345/327 |
| 6,067,558 A | * | 5/2000 | Wendt et al. ................ | 709/202 |
| 6,173,316 B1 | * | 1/2001 | De Boor et al. ............. | 709/218 |
| 6,604,106 B1 | * | 8/2003 | Bodin et al. ................ | 707/101 |

FOREIGN PATENT DOCUMENTS

| | | |
|---|---|---|
| WO | WO 98/53581 | 11/1998 |
| WO | WO 00/55640 | 9/2000 |
| WO | WO 200076155 A1 * | 12/2000 |

OTHER PUBLICATIONS

Philion, Paul, "Build servlet-based enterprise Web applications: Learn to build better, faster servlets with advanced servlet techniques", JavaWorld, Proquest, Dec. 1, 1998, p. 1-9.*
Beyond the Web: Manipulating the Real World, Goldberg et al., Computer Networks and ISDN Systems Jounal, 28(1), Dec. 1995.*
"Managing Devices with the Web", Michael Howard and Chris Sontag, Sep. 1997, Core Technologies, pp. 1-5, http://www.byte.com/art/9709/sec4/art2.htm.

* cited by examiner

*Primary Examiner*—Krisna Lim
*Assistant Examiner*—Yasin Barqadle
(74) *Attorney, Agent, or Firm*—Madson & Austin

(57) ABSTRACT

An architecture is disclosed for facilitating communications with one or more embedded devices from a client application. The architecture includes gateway software and server software. The gateway software includes device communications software for sending and receiving device messages to and from the one or more embedded devices and gateway communications software for sending and receiving communications to other software. The server software includes user interface software that is downloadable by the client application for use to communicate with the server software. The server software also includes serving software for responding to requests received from the client application through the user interface software. The server software also includes gateway communications software for sending and receiving communications to the gateway software. The architecture operates such that the server software communicates with the gateway software and the gateway software communicates with the one or more embedded devices. The server software sends a user interface component to the client application, and the client application uses the user interface component to communicate with an embedded device by sending communications to the server software. The server software facilitates communications with the embedded device through the gateway software.

19 Claims, 10 Drawing Sheets

ARCHITECTURE FOR COMMUNICATING WITH ONE OR MORE ELECTRONIC DEVICES THROUGH A GATEWAY COMPUTER

COPYRIGHT DISCLAIMER

A portion of the disclosure of this patent document contains material that is subject to copyright protection. The copyright owner has no objection to the facsimile reproduction of the patent, as it appears in the Patent and Trademark Office patent files or records, but otherwise reserves all copyright rights whatsoever.

TECHNICAL FIELD

This invention relates generally to computer technology, and is more particularly directed toward systems and methods for communicating with embedded devices through a gateway.

BACKGROUND

In recent years there has been a great increase in the amount of computer technology that is involved in daily life. In today's world, computer technology is involved in many aspects of a person's day. Many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

The small computers, (which can be rather large computers depending on the particular need which is being met by the computer), almost always have one or more processors at the heart of the computer. The processor(s) usually are interconnected to different external inputs and outputs and function to manage the particular device. For example, a processor in a vending machine for soda pop may be connected to the buttons used to select the pop, to the switch that allows a pop to drop down to a user, and to lights to indicate that the machine does not have any more pop of a particular variety.

Computer technology is involved in many aspects of daily life. Many appliances, devices, etc., include one or more small computers. For example, refrigerators, telephones, typewriters, automobiles, vending machines, and many different types of industrial equipment usually have small computers, or processors, inside of them. Computer software runs the processors of these computers and tells the processors what to do to carry out certain tasks. For example, the computer software running on a processor in a vending machine may cause a soda pop to drop to a user when the correct change has been entered by a user.

These types of small computers that are a part of a device, appliance, tool, etc., are often referred to as embedded systems. The term "embedded system" usually refers to computer hardware and software that is part of a larger system. Embedded systems usually do not have typical input and output devices such as a keyboard, mouse, and/or monitor. Usually, at the heart of each embedded system is one or more processor(s).

SUMMARY AND OBJECTS OF THE INVENTION

It is an object of the present invention to provide systems and methods for communicating with embedded devices through a gateway.

An architecture is disclosed for facilitating communications with one or more embedded devices from a client application. The architecture includes gateway software and server software. The gateway software includes device communications software for sending and receiving device messages to and from the one or more embedded devices and gateway communications software for sending and receiving communications to other software. The server software includes user interface software that is downloadable by the client application for use to communicate with the server software. The server software also includes serving software for responding to requests received from the client application through the user interface software. The server software also includes gateway communications software for sending and receiving communications to the gateway software. The architecture operates such that the server software communicates with the gateway software and the gateway software communicates with the one or more embedded devices. The server software sends a user interface component to the client application, and the client application uses the user interface component to communicate with an embedded device by sending communications to the server software. The server software facilitates communications with the embedded device through the gateway software.

In embodiments herein, the server software may include a web server. The user interface may comprise instructions written in HTML, HDML, WML, and the like. In addition, the user interface software may include a Java applet. The serving software may include a Java servlet.

The architecture may utilize a gateway computer in electronic communication with the one or more embedded devices. In addition, there may be a server computer in electronic communication with the gateway computer and also in electronic communication with a computer network for communications with a client device.

In certain embodiments, the gateway software and the server software may be running on the same computer. As a result, a gateway server computer may be used to communicate with the one or more embedded devices.

BRIEF DESCRIPTION OF THE DRAWINGS

The foregoing and other objects and features of the present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the present invention, as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

An architecture is disclosed for facilitating communications with one or more embedded devices from a client application. The architecture includes gateway software and server software. The gateway software includes device communications software for sending and receiving device messages to and from the one or more embedded devices and gateway communications software for sending and receiving communications to other software. The server software includes user interface software that is downloadable by the client application for use to communicate with the server software. The server software also includes serving software for responding to requests received from the client application through the user interface software. The server software also includes gateway communications software for sending and receiving communications to the gateway software. The architecture operates such that the server software communicates with the gateway software and the gateway software communicates with the one or more embedded devices. The server software sends a user interface component to the client application, and the client application uses the user interface component to communicate with an embedded device by sending communications to the server software. The server software facilitates communications with the embedded device through the gateway software.

In embodiments herein, the server software may include a web server. The user interface may comprise instructions written in HTML, HDML, WML, and the like. In addition, the user interface software may include a Java applet. The serving software may include a Java servlet.

The architecture may utilize a gateway computer in electronic communication with the one or more embedded devices. In addition, there may be a server computer in electronic communication with the gateway computer and also in electronic communication with a computer network for communications with a client device.

In certain embodiments, the gateway software and the server software may be running on the same computer. As a result, a gateway server computer may be used to communicate with the one or more embedded devices.

Figure 1:
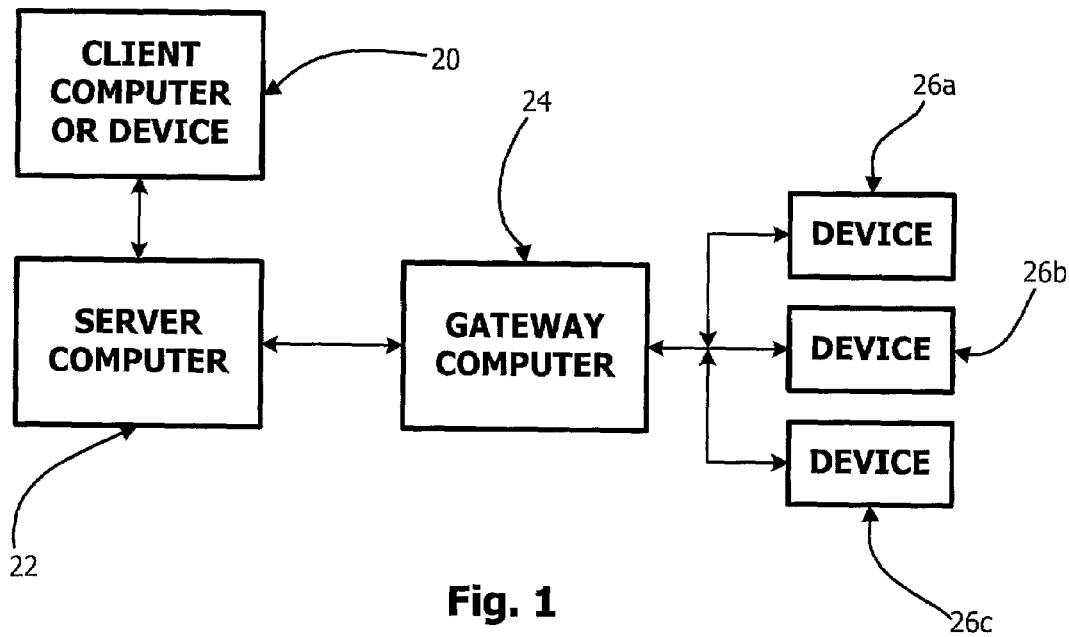
FIG. 1 is a block diagram of hardware components included in an embodiment.

FIG. 1 is a block diagram of hardware components included in an embodiment. An embodiment of an architecture for facilitating communications with one or more embedded devices includes a client computer or device 20, a server computer 22 and a gateway computer 24. The gateway computer is in electronic communication with one or more embedded devices 26.

The embedded device 26 is any device, appliance, machine, tool, or the like that is capable of receiving and/or sending electronic signals or messages or that may be enabled to receive and/or send electronic signals. Examples of devices 26 within the scope of the term device includes a vending machine, a telephone, a door lock, a temperature sensor, a motor, a switch, a light, a printer, a fax machine, a refrigerator, a health monitor, an elevator/escalator, a copier, a scanner, manufacturing equipment, industrial equipment, computer equipment and peripherals, security systems, monitoring equipment, and the like. The device 26 typically includes a processor (often, but not always, a microcontroller), memory, and a communications port as well as other input/output components.

The various components used with embodiments herein may be in electronic communication with one another through various types of communication techniques. For example, embodiments herein may be used with many kinds of computer networks.

In embodiments herein, the gateway computer 24 may be connected to the embedded devices 26 through a variety of connections, including RS 232, RS 485, modem, powerline, wired connection, wireless connection, etc. The embedded device 26 may be connected to various input and output devices (not shown) through a variety of ways.

The client computer/device 20, the server computer 22 and the gateway computer 24 are all broadly defined digital computers. A computer, as used herein, is any device that includes a digital processor capable of receiving and processing data. A computer includes the broad range of digital computers including microcontrollers, hand-held computers, personal computers, servers, mainframes, supercomputers, and any variation or related device thereof.

The client computer/device 20, the server computer 22 and the gateway computer 24 may be separate computers. In addition, and as will be illustrated, they 20, 22, 24 may be the same computer. It will be appreciated that the functionality of these computers 20, 22, 24 may be distributed across a number of computers, or it may be consolidated down into one or two computers. Thus, the required functionality is needed for embodiments herein, and those skilled in the art will appreciate that many different hardware/software configurations may be used to achieve embodiments herein.

In current design, the server computer 22 and/or the gateway computer 24 are typically IBM-compatible personal computers running the Linux, Microsoft Windows NT, ME or 2000/98/95 operating system. Of course, it will be appreciated by those skilled in the art that other types of hardware and/or software may be used to implement the embodiments disclosed herein.

As shown, the client computer/device 20 may also be included with the embodiment. The client computer/device 20 may be a computer similar to that which may be used as a server computer 22. In addition, other computing devices may be used as the client computer/device 20, for example, besides typical personal computers, a cellular telephone, a personal digital assistant, a pager, etc. may also be used as the client computer/device 20.

The embodiments herein may allow a user at a client computer/device 20 to access data/services at the embedded device 26 through the server 22 and/or gateway computer 24, even over great distances. The server computer 22, the gateway computer 24 and the client computer/device 20 may be connected together through various computer networks, such as a LAN, a WAN, the Internet, an intranet, direct-cable connections, dial-up connections, etc., or any combination thereof.

Figure 2:
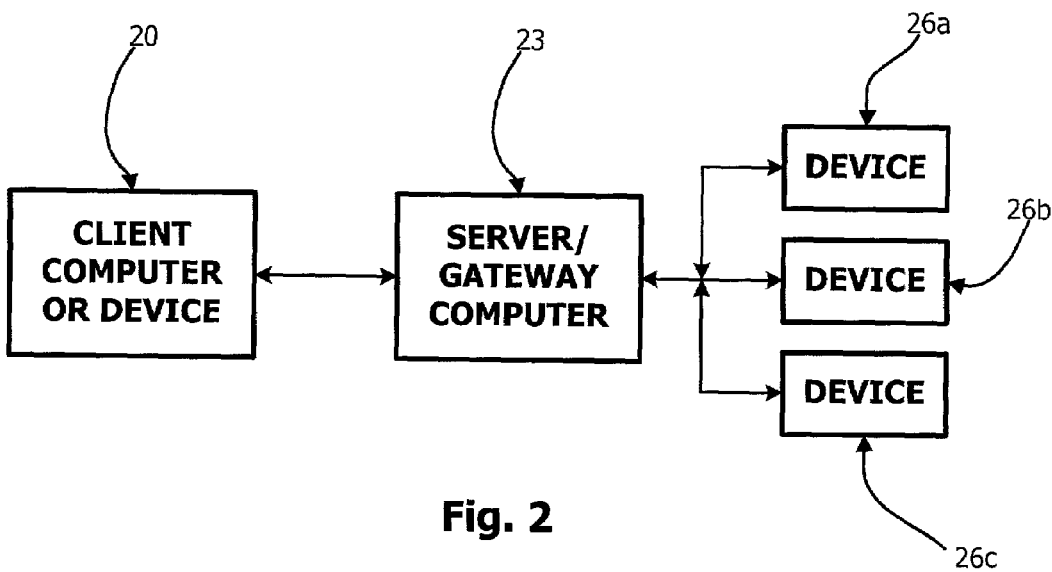
FIG. 2 is a block diagram of hardware components included in an embodiment.

FIG. 2 is a block diagram of hardware components included in a further embodiment. As shown, an embodiment of an architecture for facilitating communications with one or more embedded devices may include a client computer or device 20, a server computer 22 and a gateway computer 24. The gateway computer is in electronic communication with one or more embedded devices 26. As shown in FIG. 2, the server computer 22 and the gateway computer 24 may be the same computer. Thus, the functionality of each system may be present on one computer system. In this embodiment, the client computer/device 20 is in electronic communication with a server/gateway computer 23. The server/gateway computer 23 is in electronic communication with one or more embedded devices 26.

Figure 3:
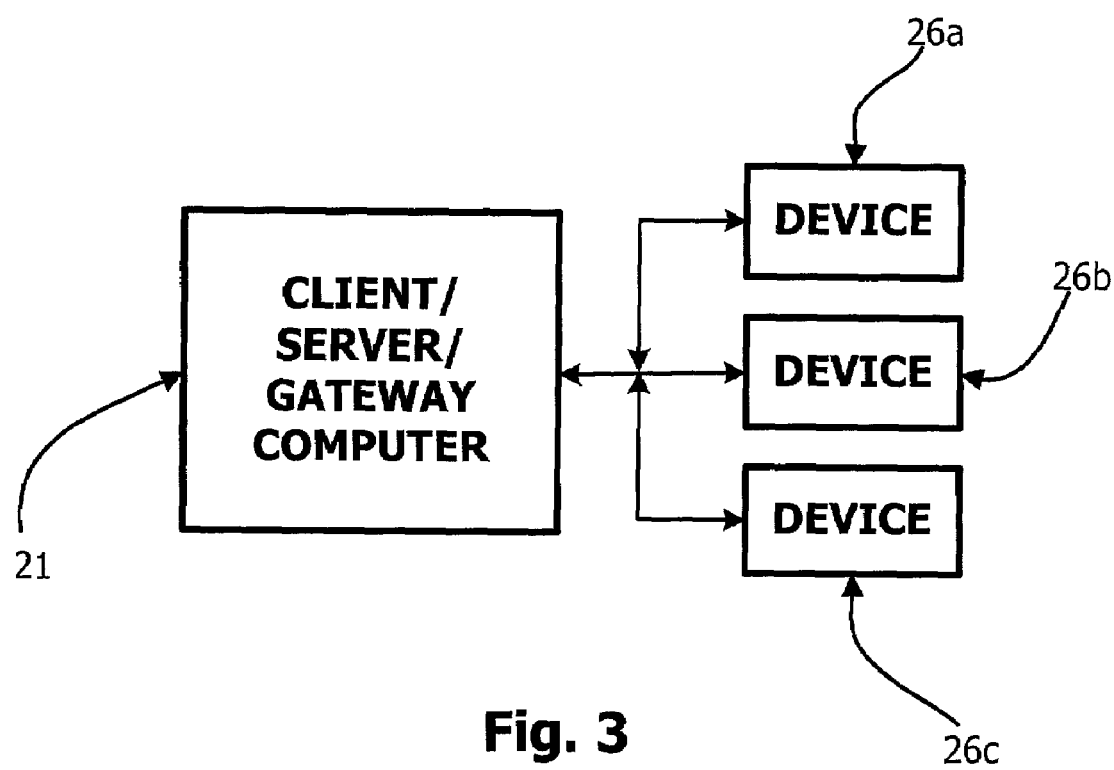
FIG. 3 is a block diagram of hardware components included in an embodiment.

FIG. 3 is a block diagram of hardware components included in a further embodiment. As shown, an embodiment of an architecture for facilitating communications with one or more embedded devices 26 may include a client computer or device 20, a server computer 22 and a gateway computer 24 all being implemented on one computer 21. The client/server/gateway computer 21 is in electronic communication with one or more embedded devices 26. As shown, the functionality of each system may be present on one computer system 21. In this embodiment, the client computer/device functionality, the server computer functionality and the gateway computer functionality all communicate with each other on the same computer 21. The client/server/gateway computer 21 is in electronic communication with one or more embedded devices 26.

As explained herein, the various components of the hardware embodiments shown in FIGS. 1–3 may be implemented in various ways with many different kinds of hardware and/or software combinations. FIGS. 4–7 illustrate further embodiments of hardware configurations that may be used with the inventive principles and concepts disclosed herein. Of course, it will be appreciated by those skilled in the art that additional changes may be made to embodiments herein without departing from the scope of the claims.

Figure 4:
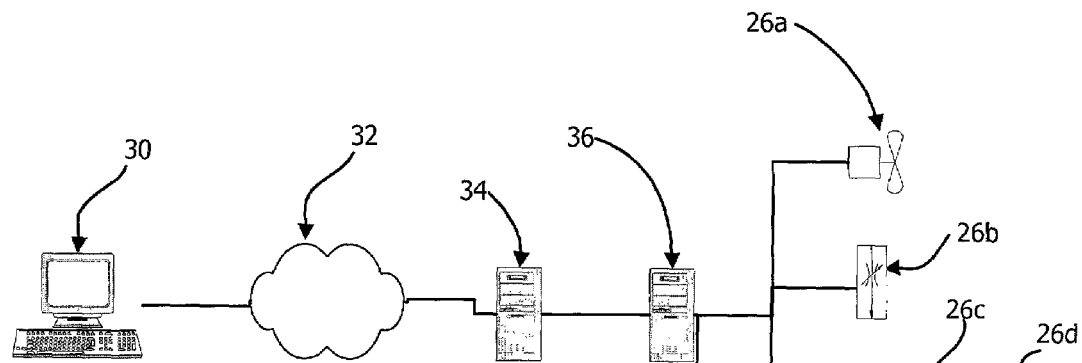
FIG. 4 is a block diagram of hardware components included in an embodiment.

FIG. 4 is a block diagram of hardware components included in a further embodiment. As shown, the client computer 20 is a personal computer 30. The server computer 22 is also a type of personal computer 34. In the embodiment of FIG. 4, the personal computer 30 connects to the server PC 34 through a computer network 32. The computer network 32 illustrated in FIG. 4 is the Internet. The gateway computer 24 is also a type of personal computer 36. The gateway PC 36 and the server PC 34 are in electronic communication with one another.

The gateway PC 36 is in electronic communication with one or more embedded devices 26. Examples of embedded devices 26 are shown in FIG. 4. A propeller fan 26a may be in electronic communication with the gateway PC 36. FIG. 4 also illustrates a flow control valve 26b as an embedded device. A microwave 26c may also be connected to the gateway PC 36. Some devices may be more directly connected to the gateway PC 36, while others may be more indirectly connected to the gateway PC 36. For example, as shown in FIG. 4, a fluorescent lamp 26d may be connected to the gateway PC 36 through a computer network 33. The computer network 33 may be the Internet, an intranet, a LAN, a WAN, etc.

Figure 5:
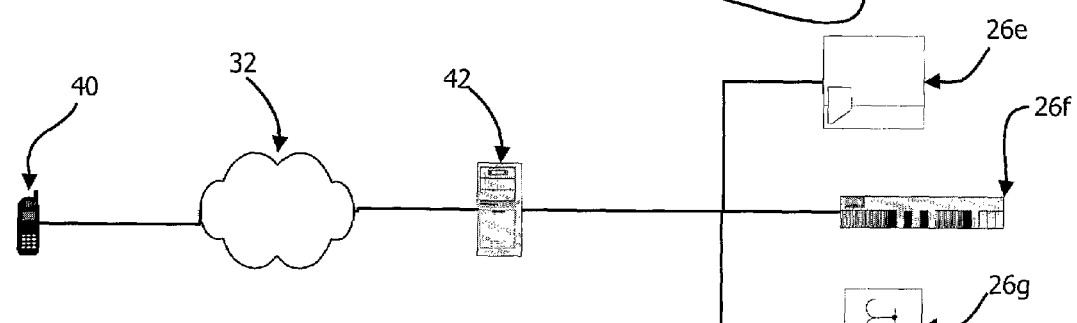
FIG. 5 is a block diagram of hardware components included in an embodiment.

FIG. 5 is a block diagram of hardware components included in a further embodiment. As shown, the client computer 20 is a cellular telephone 40. FIG. 5 illustrates an embodiment where in the server computer 22 and the gateway computer 24 are the same computer 23. The server/gateway computer 23 is also a type of personal computer 42. In the embodiment of FIG. 5, the client device cellular telephone 40 connects to the server/gateway PC 42 through a computer network 32. Many cellular telephones 40 and services are now commercially available for allowing a user to connect to the Internet and browse the World Wide Web through a mobile telephone. Such telephones 40 and services may be used with embodiments herein.

The server/gateway PC 42 is in electronic communication with one or more embedded devices 26. Further examples of embedded devices 26 are shown in FIG. 5. A vending machine 26e may be in electronic communication with the server/gateway PC 42. FIG. 5 also illustrates a router 26f as an embedded device. An outdoor metering device 26g may also be connected to the server/gateway PC 42.

Figure 6:
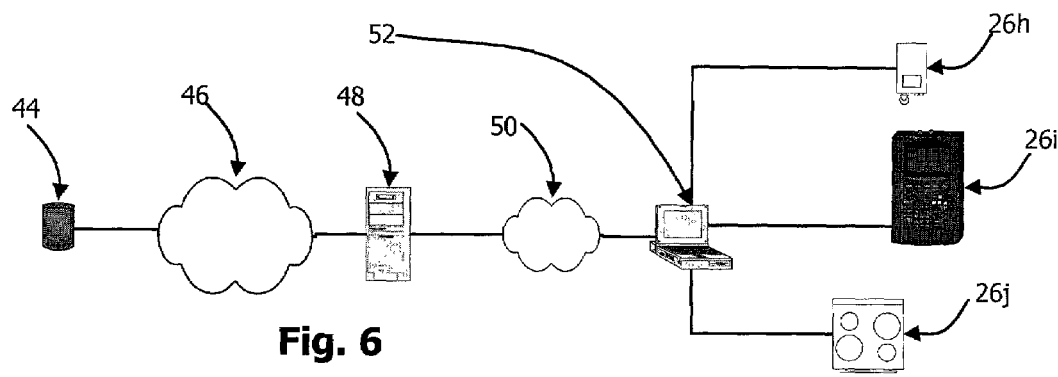
FIG. 6 is a block diagram of hardware components included in an embodiment.

FIG. 6 is a block diagram of hardware components included in a further embodiment. As shown, the client computer 20 is a personal digital assistant ("PDA") 44. The PDA is in electronic communication with the server PC 48 through a computer network 46. FIG. 6 illustrates an embodiment where the server computer 22 and the gateway computer 24 are in electronic communication with each other through a computer network 50. In the embodiment of FIG. 6, the client PDA 44 communicates with the server PC 48 through a computer network 32. Many PDAs 44 and services are now commercially available for allowing a user to connect to the Internet or to another type of computer network. Such PDAs 44 and services may be used with embodiments herein.

As shown, the gateway PC 52 is a laptop computer 52. The gateway PC 52 is in electronic communication with one or more embedded devices 26. Further examples of embedded devices 26 are shown in FIG. 6. A coffee maker 26h may be in electronic communication with the gateway PC 52. FIG. 6 also illustrates a handheld device 26i as an embedded device. A stove 26j may also be connected to the gateway PC 52.

Figure 7:
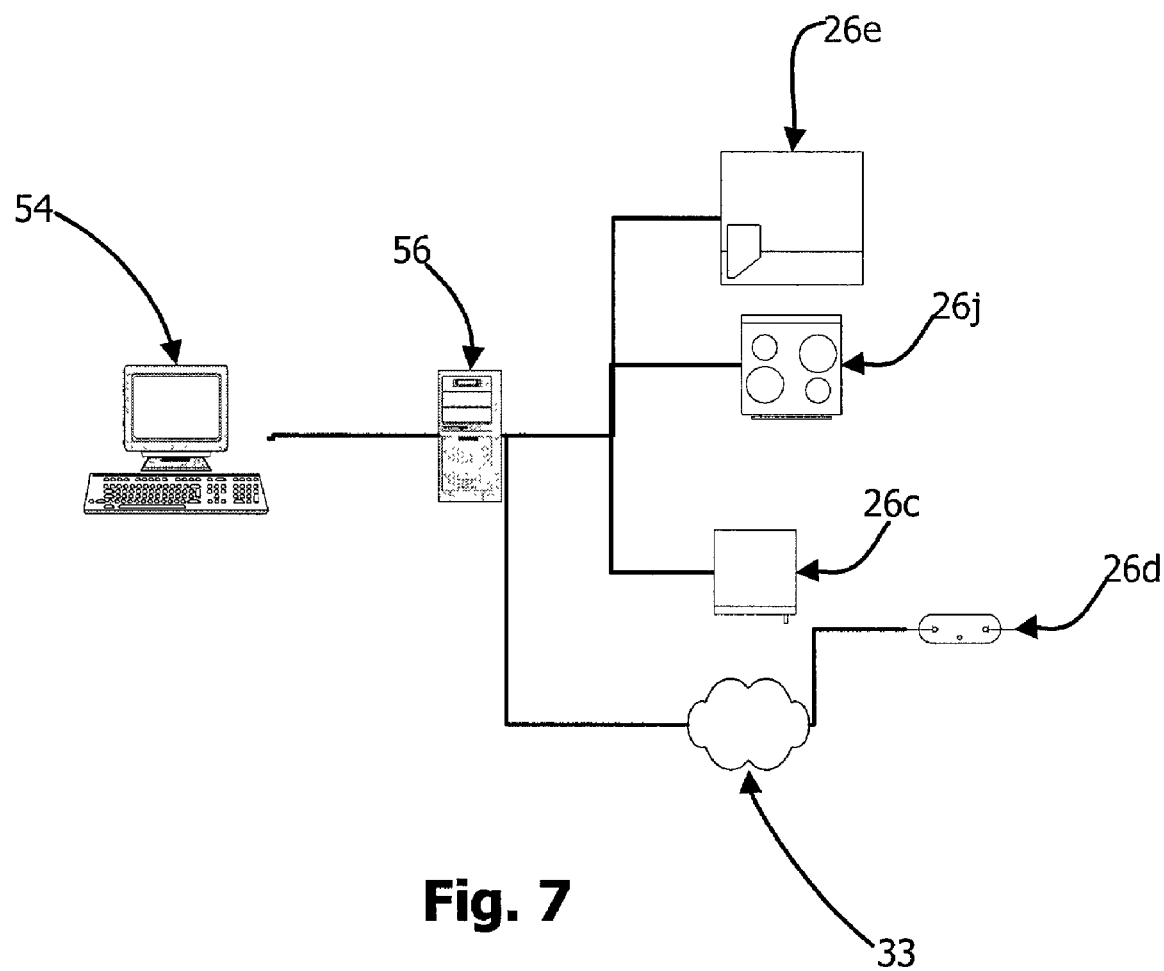
FIG. 7 is a block diagram of hardware components included in an embodiment.

FIG. 7 is a block diagram of hardware components included in a further embodiment. In the embodiment of FIG. 7, the functionality of the client computer 20, server computer 22 and gateway computer 24 is all on one computer 56. FIG. 7 illustrates a dumb terminal 54 in electronic communication with the client/server/gateway PC 56.

The client/server/gateway PC 52 is in electronic communication with one or more embedded devices 26. The embedded devices 26 illustrated in FIG. 7 are a vending machine 26e, a stove 26j, a fluorescent lamp 26d and a microwave 26c.

Figure 8:
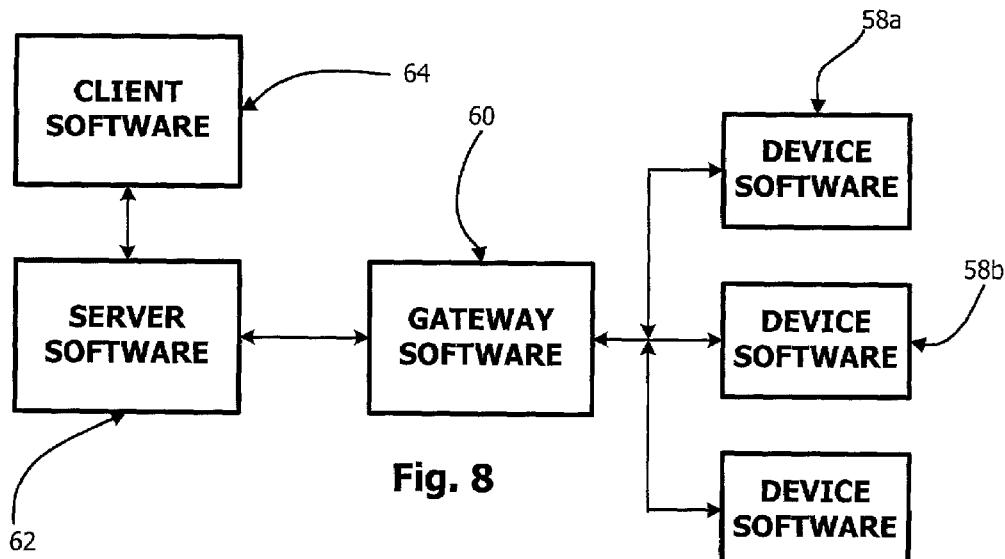
FIG. 8 is a block diagram of software components included in an embodiment.

FIG. 8 is a block diagram of software components included in an embodiment. FIGS. 1–7 illustrated possible hardware configurations that may be used with embodiments herein. FIGS. 8–13 illustrate possible software configurations that may be used with embodiments herein. It will be appreciated by those skilled in the art that the functionality discussed herein may be distributed across multiple computer systems, or it may be consolidated down into only one computer system. Thus, the examples of the software configurations are only meant as exemplary configurations and are not the only configurations that may be used.

The embodiment of FIG. 8 illustrates several pieces of device software 58. Each piece of device software is typically loaded and running on a device. Usually the device software 58 is embedded in the particular device. Those skilled in the art appreciate will appreciate how to write software for embedded devices and how to load the software on the embedded device.

The gateway software 60 provides communication to and from the devices to other computers and/or software that need to communicate with the embedded devices. The gateway software 60 is programmed to communicate with at least one type of embedded device. In the embodiments shown herein, the gateway 60 is programmed to communicate with several different types of embedded devices. Depending upon the type of device that the gateway needs to communicate with, different functionality may be programmed in the gateway. For example, if one device only understands on protocol, the gateway may be programmed to also understand that protocol so that it may communicate with the device. Alternatively, the device may be programmed with an additional protocol that the gateway 60 understands.

The gateway software 60 is also programmed to access data and services at the devices. Typically, data, functions, events, etc., on the device that someone may want to access are made available by programming the gateway 60 and/or the device software 58 to expose these items. Those skilled in the art will appreciate that the device may be programmed to allow access to items on the device, or the gateway 60 may be programmed to access the items on the device, or a combination of programming in the device software 58 as well as the gateway software 60 may be accomplished to facilitate access to items on the device.

The gateway software 60 also has the functionality to allow other computers to send and receive data or messages to the devices through use of the gateway software 60. Accordingly, the gateway 60 includes the functionality that would allow another computer to send messages to the gateway 60. For example, the gateway 60 may understand and be able to communicate using TCP/IP. In addition, the gateway 60 may include an application programming interface ("API") that other computers may use in communicating with the gateway 60. The gateway 60 would receive the message and perform any processing necessary. In some circumstances, the gateway 60 may forward the message on, whether in the same form or in an alternate form, to the particular device or devices. The gateway 60 may have the necessary information and/or functionality to process the message and respond to the message without needing to access or communicate with a device.

There are commercially available software packages and technology that would serve as the gateway software 60 and that also could serve as the device software 58. em Ware, Inc. provides software solutions that can be used as gateway software 60 and that can be used as the device software 58 or to implement the device software 58. More particularly, EMIT® (Embedded Micro Internetworking Technology) software from em Ware may be licensed and used to implement gateway software 60 and/or device software 58.

The server software 62 provides an interface to the gateway software 60 for the client software 64. The server software 62 is programmed to service requests from the client software 64. In servicing the requests, the server software 62 may communicate with the gateway software 60. If the server software 62 has sufficient information and functionality to service the request alone or with the assistance of third-party software, it may service the request without communicating with the gateway software 60. Because the server software 62 serves as an interface between client software 64 and the gateway software 60, the server 62 is programmed to communicate with the client software 64 and is also programmed to communicate with the gateway software 60. Those skilled in the art will appreciate the many communication techniques that may be used to communicate with the client software 64 and/or the gateway software 60.

The client software 64 serves as an interface for a user to communicate with the embedded devices. The particular features of the client software 64 may vary depending upon the device or devices that are being accessed with the software 64. The client software 64 communicates with the embedded devices through the server software 62 and the gateway software 60, as shown and described.

Figure 9:
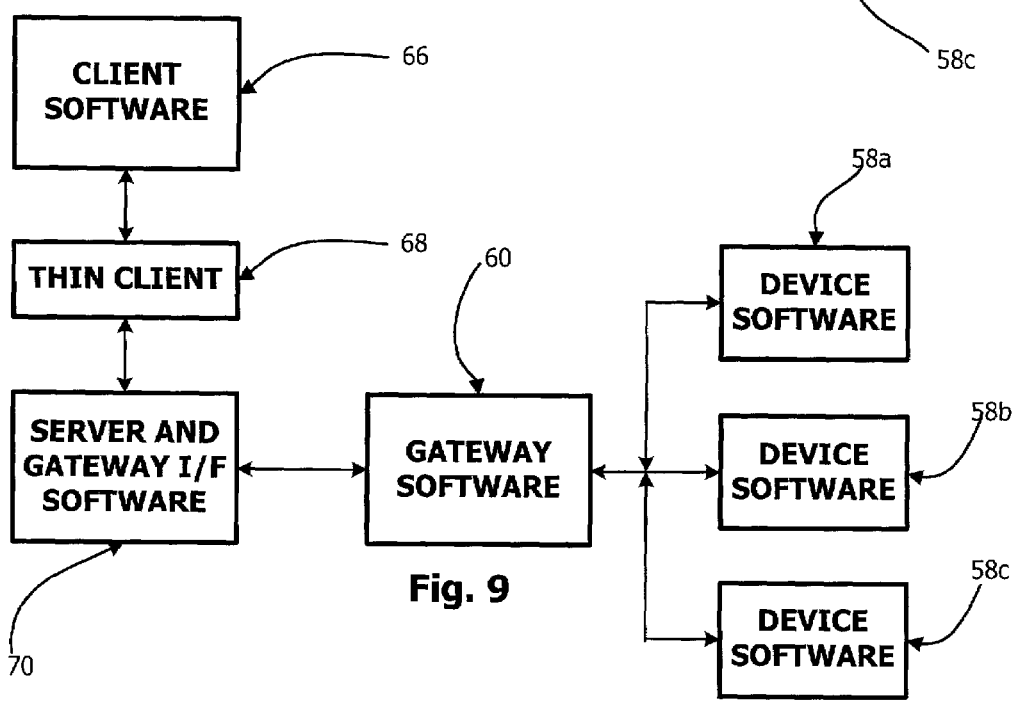
FIG. 9 is a block diagram of software components included in an embodiment.

FIG. 9 is a block diagram of software components included in a further embodiment. The embodiment of FIG. 9 illustrates the gateway software 60 and the device software 58 as shown and described above. In this embodiment, the client software 66 may be a more general program capable of processing data. For example, the client software 66 may be a web browser, a document editor, a media player, a program for receiving streams, etc. The thin client 68 is a software component that can be processed or used by the client software 66 in order to present information or an interface to a user. The server and gateway interface software 70 serves to receive and process requests from the client software 66 and/or the thin client 68. In the embodiment of FIG. 9, the client software 66 includes functionality that enables the thin client 68 to be smaller and more particularly focused on the data or information necessary for a user interface to communicate with the device. If a user already has the client software 66, then only the thin client 68 needs to be obtained for communications to and from the devices.

Figure 10:
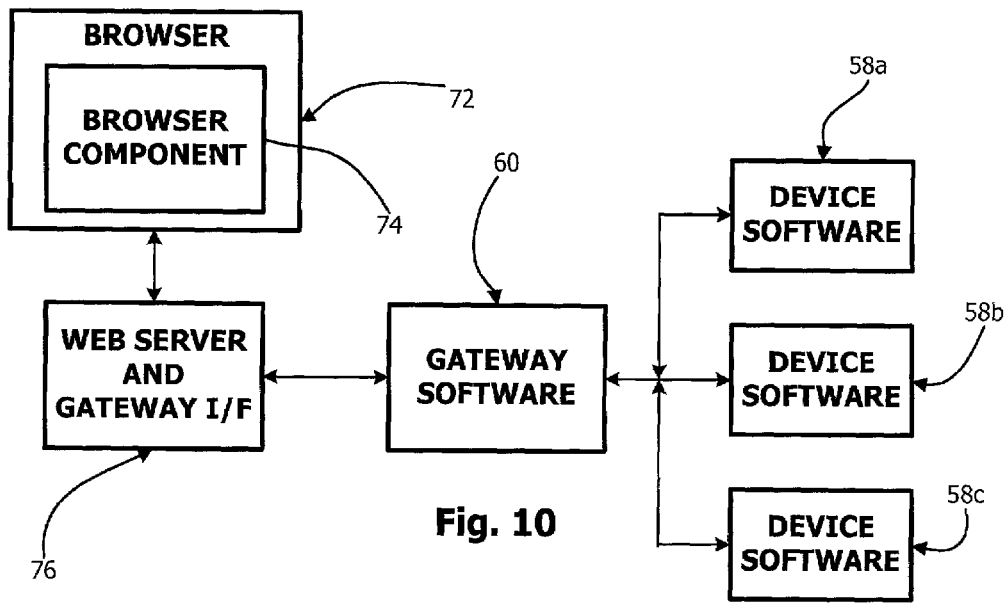
FIG. 10 is a block diagram of software components included in an embodiment.

FIG. 10 is a block diagram of software components included in a further embodiment. The embodiment of FIG. 10 is implemented using techniques and components commonly used with the World Wide Web (the "Web"). A web browser 72 is used by a user to communicate with the devices. Web browsers are commercially available and are commonly used by persons accessing the Internet.

In this embodiment, a browser component 74 includes the user interface and functionality necessary to communicate with the embedded devices through a web server 76 and the gateway software 60. A browser component 74 is any set of instructions that can be processed by the browser 72 to provide a user interface to a user through which the user can communicate with the embedded devices. Examples of browser components 74 will be shown and discussed with FIG. 11.

The web server and gateway interface 76 receive and process requests from the browser 72 and/or browser component 74 and send appropriate communications to the gateway software 60 as necessitated by the requests from the user. Web servers are commercially available and can be used in implementing the embodiment of FIG. 10 as long as the necessary gateway communications functionality is added to the server. The gateway interface portion of the web server includes the functionality and logic to communicate with the gateway.

Figure 11:
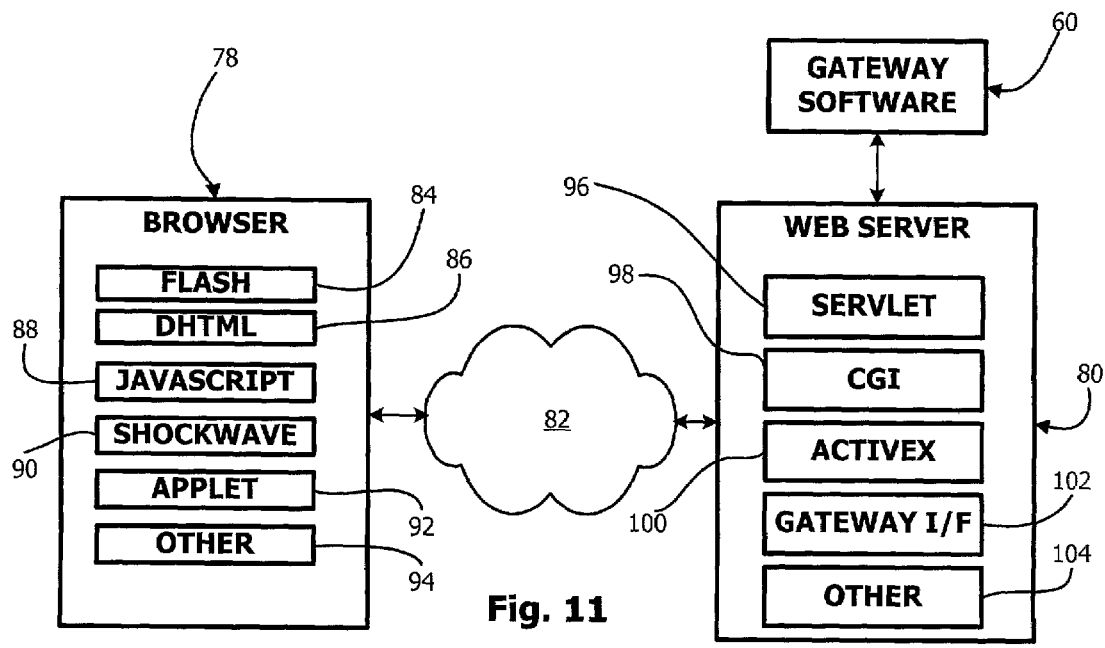
FIG. 11 is a block diagram of software components included in an embodiment.

FIG. 11 is a block diagram of software components included in a further embodiment. The embodiment of FIG. 11 includes a web browser 78 communicating with a web server 80 over the Internet 82.

The browser 78 can use various components to provide a user interface to a user. For example flash 84, DHTML 86, Javascript 88, shockwave 90 and/or an applet 92 may be used to provide an interface to a user for communicating with or accessing an embedded device. Of course, it will be appreciated by those skilled in the art that other 94 components may also be used.

The web server 80 may use various components to process requests from the user. For example, the web server 80 may user one more of any of the following: servlets 96, CGI scripts 98 or ActiveX components 100. Of course, it will be appreciated by those skilled in the art that other components 104 may also be used.

The web server 80 may also include other gateway interface 102 instructions and/or components. Many components available may be programmed with the functionality necessary to communicate with the gateway 60. For example, servlets 96, CGI scripts 98 and ActiveX components may all be programmed and used to communicate with the gateway 60. In addition, gateway interface instructions 102 may be provided.

Figure 12:
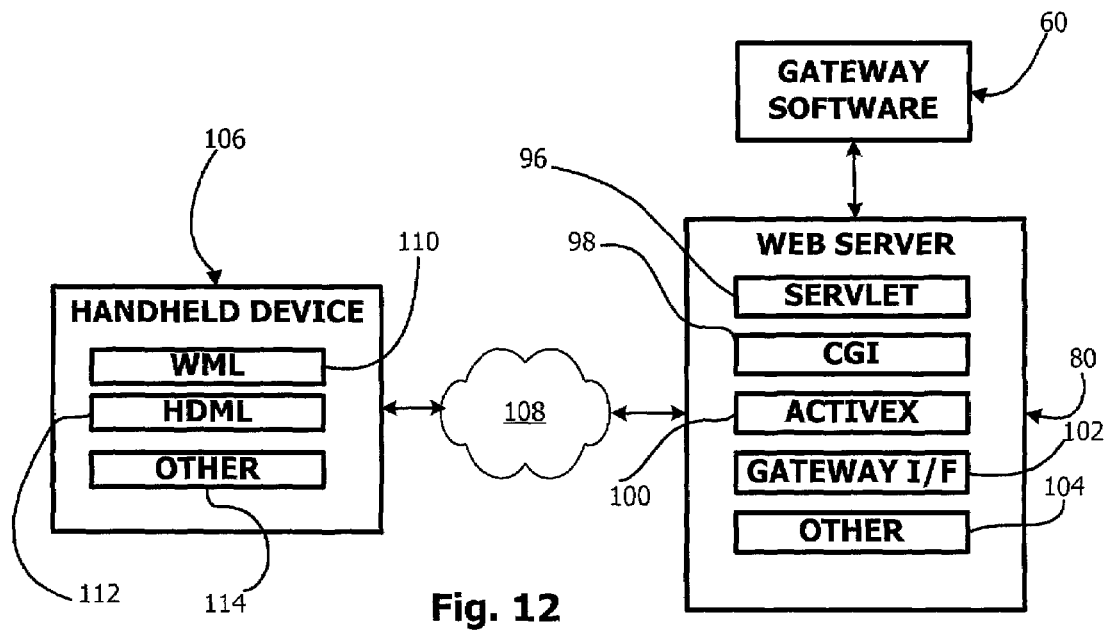
FIG. 12 is a block diagram of software components included in an embodiment.

FIG. 12 is a block diagram of software components included in a further embodiment. The embodiment of FIG. 12 illustrates handheld device software 106 communicating with the web server 80 over a communications network 108. The handheld device 106 may be any type of electronic device capable of processing instructions to provide an interface for a user. The interface could be a visual user interface, an audio interface, or any other type of interface that would allow a user or client to communicate with server type software to achieve communications with an embedded device.

The handheld device software 106 can use various components to provide a user interface to a user. For example WML 110 or HDML 112 may be used to provide an interface to a user for communicating with or accessing an embedded device. Of course, it will be appreciated by those skilled in the art that other 114 components may also be used. Each type of handheld device may have particular software techniques, components, modules, etc., that may be particularly suited for use with the device.

The communication network 108 may be any one or more networks capable of electronic communications. For example, the communications network 108 may include a wireless network (not shown) as well as a global computer network, such as the Internet. In addition, the communications network 108 may include local area networks, wide area networks, cellular networks, pager networks, direct cable connections, dial-up connections, etc.

Figure 13:
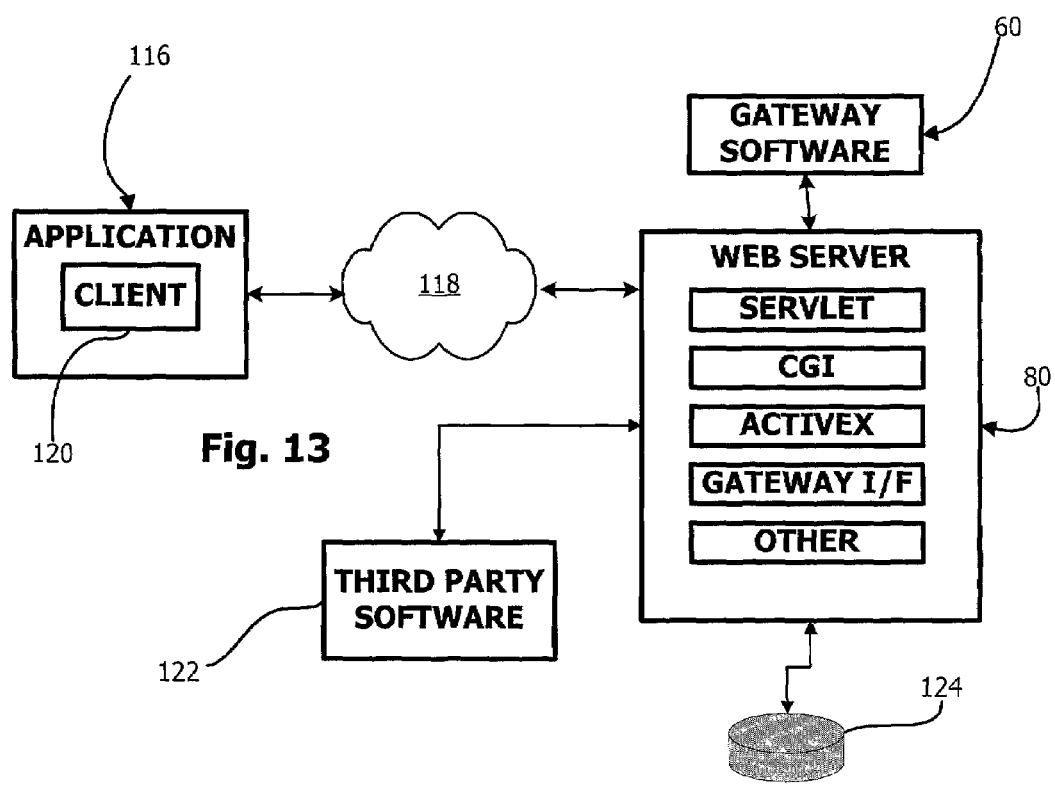
FIG. 13 is a block diagram of software components included in an embodiment.

FIG. 13 is a block diagram of software components included in a further embodiment. FIG. 13 illustrates a more generic application 116 communicating with a web server 80 over a communications network 118. The application 116 uses a client component 120 to provide a user interface to a user. The client 120 may be downloaded from the web server 80 for use by the application 116.

As shown, the web server 80 may use third party software 122 in accomplishing its tasks. Third party software 122 may include a variety of programs or sets of instructions to accomplish tasks that are necessary or that are helpful to the web server 80 or any of its components. For example, the third party software 122 may include security components for restricting access or verifying a user's identity, providing weather information, storing or accessing user preferences, aggregating data, emailing messages to recipients, etc.

The web server 80 may also access a database 124 to store or retrieve information that may be needed. For example, the web server 80 may be receiving communications from many embedded devices. In this situation, the web server 80 may store the information or data it receives in a database 124. The database 124 may also be used to store the various components that are sent to client computers 20.

Figure 14:
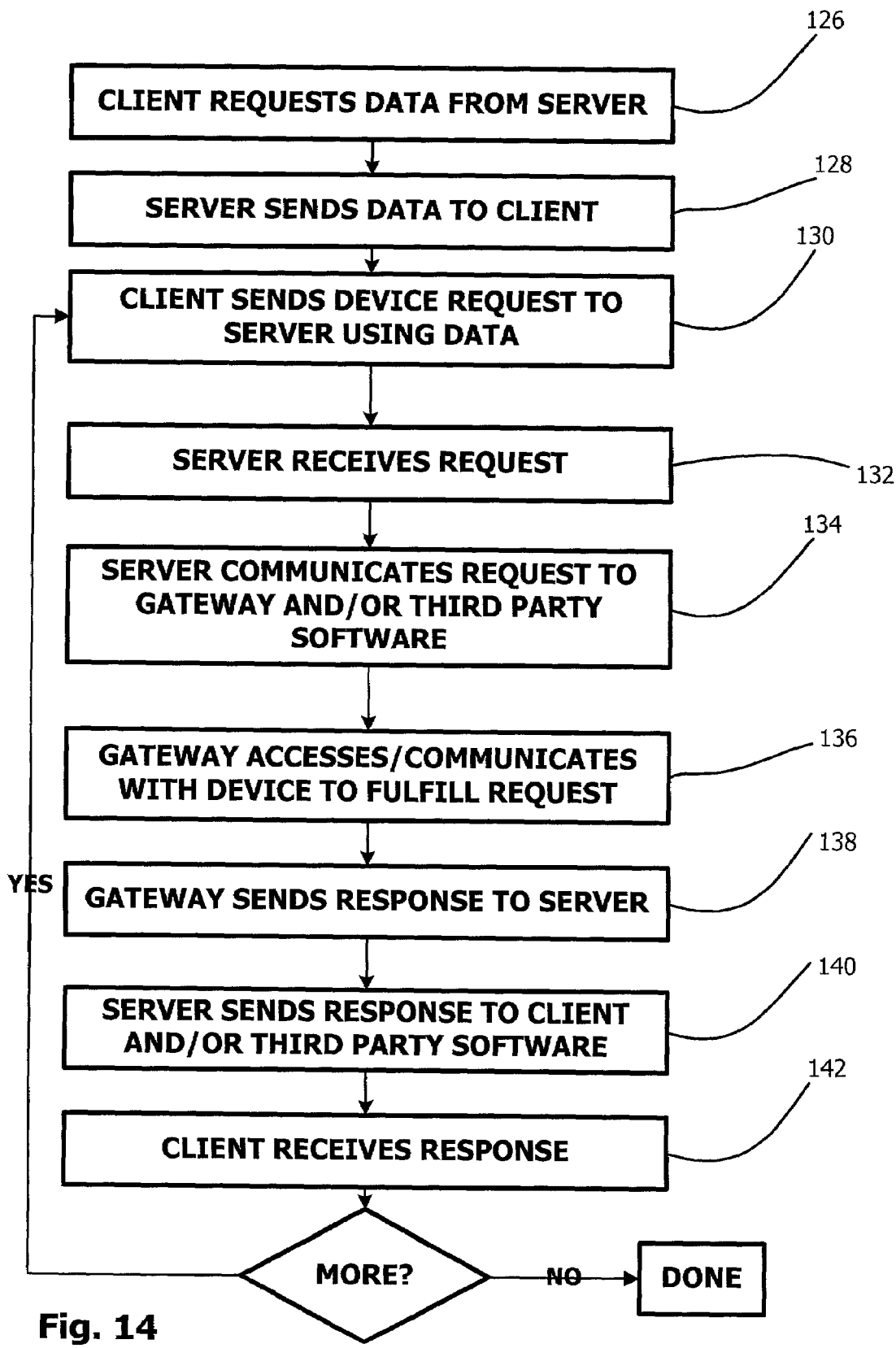
FIG. 14 is a flow diagram of a method used with an embodiment.

FIG. 14 is a flow diagram of a method used with an embodiment. Generally, a client or device requests 126 data from the server. The server responds by sending 128 the data requested to the client. Using the data received, the client sends 130 a device request to the server. The device request is any communication that relates to an embedded device.

The server receives 132 the request and, if necessary, communicates 134 the request to the gateway and/or third party software. The gateway accesses or communicates 136 with the device or devices to fulfill the request. The gateway then sends 138 a response to the server. The server may send 140 a response to the client and/or to third party software. The client receives 142 the response and may perform further processing. If the client desires to send more requests to the server, as shown, the client sends 130 another request to the server, and the processing may continue as shown and discussed. If the client has no more need to communicate with the server and embedded devices, the process may be complete.

Figure 15:
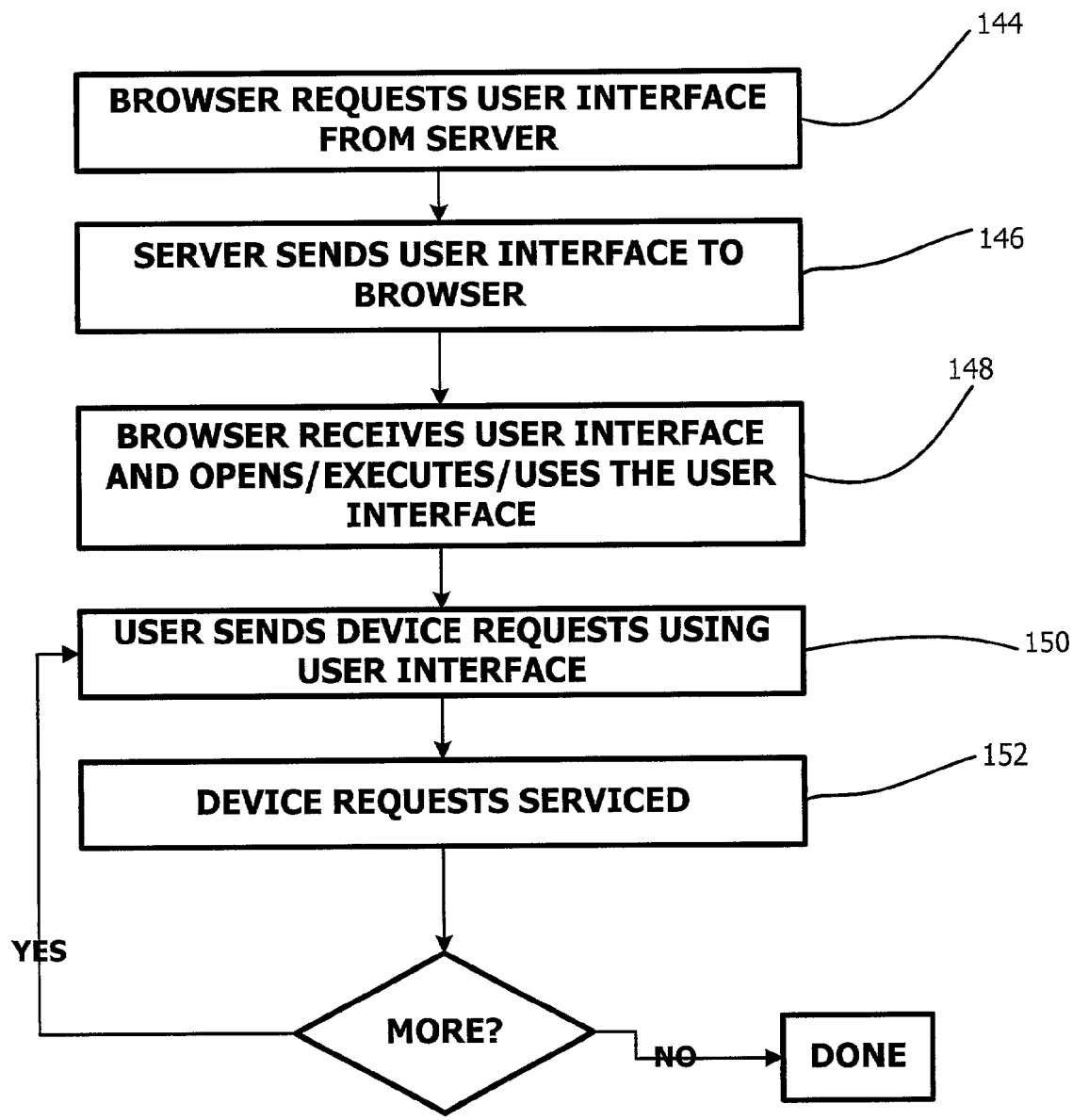
FIG. 15 is a flow diagram of a method used with an embodiment.

FIG. 15 is a flow diagram of a method used with a further embodiment. The embodiment of FIG. 15 is more particularly directed towards an embodiment using a web browser and web server. The browser requests 144 the user interface from the server. This request may simply be an HTTP request for a particular document or component, it may be a command sent to a component on the server, etc.

The server receives the request and sends 146 the user interface component to the browser. The browser then receives the component and opens, executes or otherwise uses 148 the component to provide an interface for the user to communicate with one or more embedded devices via the server and gateway communication pathway.

Using the user interface, the user sends 150 device requests. The device requests are serviced, as discussed herein. The request and the processing of the request may be repeated until all requests have been serviced.

Figure 16:
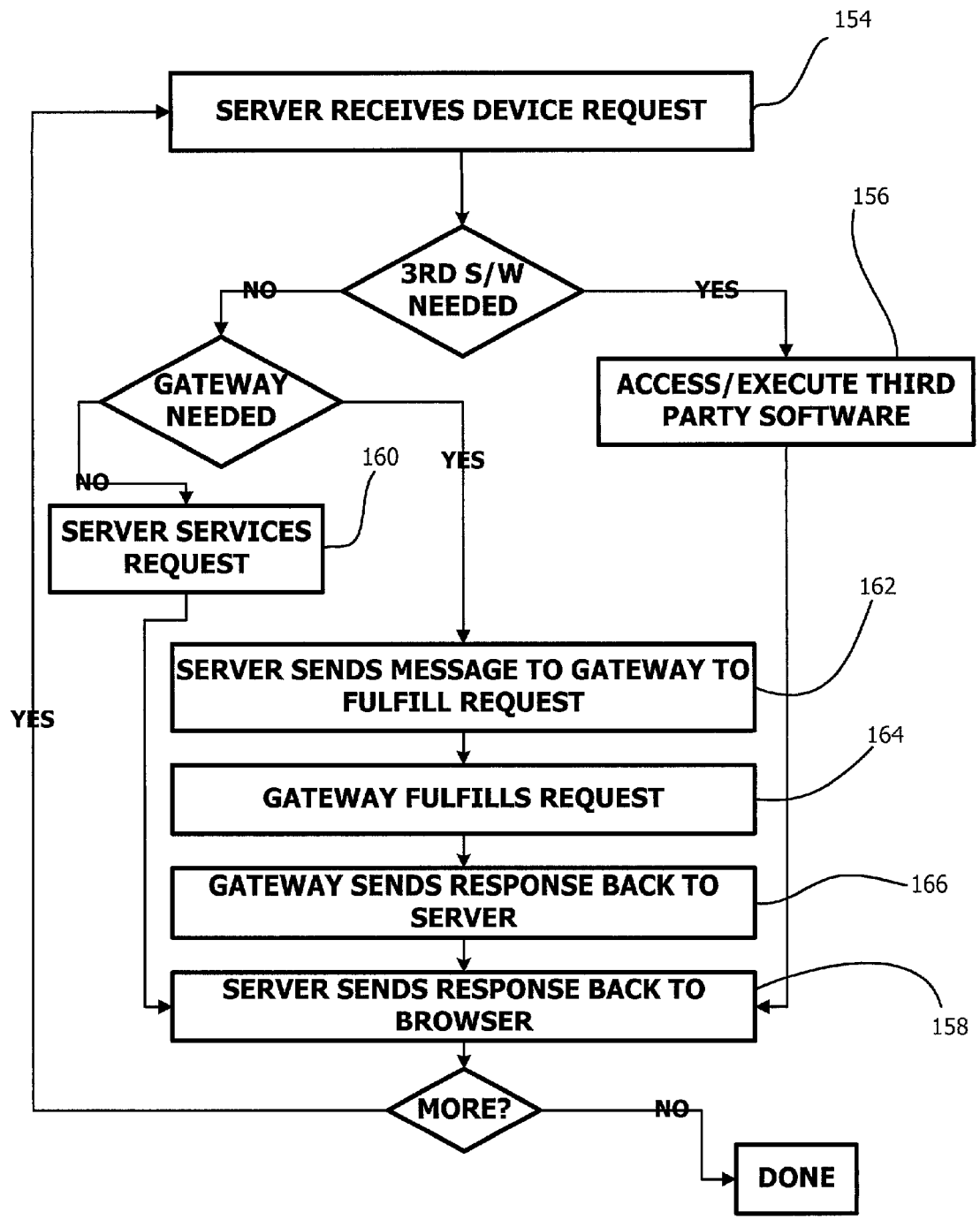
FIG. 16 is a flow diagram of a method used with an embodiment.

FIG. 16 is a flow diagram of a method used with a further embodiment. The embodiment of FIG. 16 illustrates the server/gateway side of processing. The server receives 154 a device request from a client. The server may determine whether any third party software is needed to fulfill the request. If third party software is needed, the third party software may then be accessed or executed 156, as needed. The server may then send 158 a response back to the browser. If more processing is needed, the flow of steps may continue as illustrated.

The server may determine whether the gateway is needed to fulfill the request. If the gateway is not needed, then the server may service 160 the request and send 158 a response back to the browser. If more processing is needed, the flow of steps may continue as illustrated.

If the gateway is needed to fulfill the request, the server may send 162 a message to the gateway to facilitate the request being fulfilled. The gateway may fulfill 164 the request, either partially or fully, by processing the message and/or by providing requested information, or by providing the data necessary for the server to provide the proper response. The gateway may then send 166 a response back to the server. The server may send 158 a response to the browser. If more processing is needed, the flow of steps may continue as illustrated.

WAP and EMIT SDK Example

The following WAP ("Wireless Application Protocol") example provides a basic tutorial on using WML ("Wireless Markup Language") and HDML ("Handheld Device Markup Language") along with software and hardware packages available from em Ware, Inc., including EMIT®, em Ware's emGateway™ software and development kits.

WML and HDML are the basis for presentation on web-enabled wireless devices including cellular phones and PDA's. The examples herein can be used and viewed from a WAP enabled device or emulator. To implement and use these examples, a server needs to be configured for WML and HDML. A WAP emulator or simulator may also be useful. One such simulator is provided by Phone.Com: the UP.Simulator. This simulator is presently available from the Phone.com developer site. To run the servlets, a servlet engine is needed. One such servlet engine is the Resin Servlet Runner.

A resource constraint of the wireless devices being sold today is the amount of onboard memory. Because of this current constraint, it is recommended that each individual Deck be limited to 1350 bytes of 'compiled' data. (A "Deck" is a commonly used description of an entire file sent to the wireless device. A Deck may contain many "cards".) Although some phones will support much larger file sizes, there are presently a large number of WAP devices that will support no more than the recommended size. "Compiled" in this context means it is compressed by the WAP gateway for sending to the mobile phone. Different WAP gateways vary in how they compile a WML page. Accordingly, if a particular page is close to the limit, it may be that occasionally it does not work on some gateways, or even some phones. Another current resource constraint of wireless devices is their slow connection. Most devices top out at about 9600 bps. As a result, the present embodiments keep the file size small. However, it will be appreciated by those skilled in the art that wireless devices will be equipped with more resources, with the ability to connect at higher data rates, etc., such that the current need to keep the file sizes small will no longer be an issue.

An understanding of programming using HDML and WML is assumed. Many resources are currently available to educate and train programmers in HDML and WML. Accordingly, these examples will focus on how to use WML and HDML with em Ware® technology to achieve the present embodiments. The examples will not attempt to teach the basics of HDML or WML programming. The following examples use the EMIT®-enabled Hitachi H8 SDK board available from emWare. The examples also use the emGateway™ software and a Java servlet.

The following example is a simple application that connects to and controls an EMIT®-enabled Hitachi H8 SDK board using emGateway™ software and a Java servlet. The SDK board currently includes LEDs and a rotary knob. These applications will pull the values of the red and green LEDs and the rotary knob, and display them on the wireless device. The applications also allow a user to change the values on the red and green LEDs (this will adjust their brightness).

THe following examples use a servlet and HDML:

```
import java.io.*;
import javax.servlet.*;
import javax.servlet.http.*;
import java.awt.*;
import java.util.*;
import java.awt.event.*;
import emJava20.emCore.*;
import com.emWare.emClient.*;
import com.emWare.emAWT.*;
public class emitsdkhdml extends HttpServlet
{
        JEmit jemit;
        public emitsdkhdml()
        {
            jemit = new JEmit();
            try
            {
                jemit.setHost("10.1.1.29");
                jemit.setPort(88);
                /*
                jemit.setUsername("Username goes here if Nec.");
                jemit.setPassword("Password Goes here if Nec.");
                */
                jemit.setDevice("d=005040000001");
                jemit.connect();
            }
            catch (Exception e)
            {
            System.out.println("Connecting: "+ e);
            }
            try
            {
                jemit.poll();
            }
            catch (Exception e)
            {
```

-continued

```
                    System.out.println("Starting poll: "+e);
                }
            }
            public void doGet(HttpServletRequest req, HttpServletResponse res) throws ServletException,
IOException
                {
                    res.setContentType("text/x-hdml");
                    PrintWriter out = res.getWriter();
                    try
                    {
                    Short redObj = (Short)jemit.getVariable("Red");
                    short redValdrt = redObj.shortValue();
                    int redVallnt = redValdrt;
                    String redVal = Integer.toString(redVallnt);
                    Short greenObj = (Short)jemit.getVariable("Green");
                    short greenValdrt = greenObj.shortValue();
                    int greenVallnt = greenValdrt;
                    String greenVal = Integer.toString(greenVallnt);
                    Short knobObj = (Short)jemit.getVariable("Knob");
                    short knobValdrt = knobObj.shortValue();
                    int knobVallnt = knobValdrt;
                    String knobVal = Integer.toString(knobVallnt);
                    Random rand = new Random();
                    if (req.getParameter("label")==null)
                    {
    out.println("<HDML VERSION=3.0 TTL=0>");
    out.println("  <!-- Sets variables then skips to #home -->");
    out.println("  <nodisplay>");
    out.println("   <ACTION     TYPE=ACCEPT     TASK=GO     DEST=#home
VARS=red="+redVal+"&green="+greenVal+"&knob="+knobVal+">");
    out.println("  </nodisplay>");
    out.println("  <DISPLAY NAME=home>");
    out.println("   <ACTION                  TYPE=ACCEPT              TASK=GO
DEST=http://"+req.getServerName()+":"+req.getServerPort()+""+req.getRequestURI()+"?"+rand.nextInt
()+"#menu VARS=red="+redVal+"&green="+greenVal+"&knob="+knobVal+">");
    out.println("      <CENTER>Hello!<br>");
    out.println("      Welcome to<br>");
    out.println("      EMWARE<br>");
    out.println("       <br>");
    out.println("      Press OK to go to the menu page.");
    out.println("  </DISPLAY>");
    out.println("  <CHOICE name=menu>");
    out.println("   <ACTION    TYPE=SOFT1    LABEL=Refresh    TASK=GO
DEST=http://"+req.getServerName()+":"+req.getServerPort()+""+req.getRequestURI()+"?"+rand.nextInt
()+"#menu VARS=red="+redVal+"&green="+greenVal+"&knob="+knobVal+">");
    out.println("      Red: $red<br>");
    out.println("      Green: $green<br>");
    out.println(" Knob: $knob<br>");
    out.println("      <CE TASK=GO DEST=#setred LABEL=Red>Set Red LED");
    out.println("      <CE TASK=GO DEST=#setgreen LABEL=Green>Set Green LED");
    out.println("      <CE TASK=GO DEST=#home LABEL=Home>Go Home");
    out.println("  </CHOICE>");
    out.println("  <ENTRY NAME=setred KEY=red FORMAT=NNN>");
    out.println("   <ACTION     TYPE=accept     LABEL=Set     TASK=GO
VARS=red="+redVal+"
DEST=http://"+req.getServerName()+":"+req.getServerPort()+""+req.getRequestURI()+"?label=1&val=$
red>");
    out.println("      Enter the new value of red:");
    out.println("  </ENTRY>");
    out.println("  <ENTRY NAME=setgreen KEY=green FORMAT=NNN>");
    out.println("   <ACTION     TYPE=accept     LABEL=Set     TASK=GO
VARS=green="+greenVal+"
DEST=http://"+req.getserverName()+":"+req.getServerPort()+""+req.getRequestURI()+"?label=2&val=$
green>");
    out.println("      Enter the new value of green:");
    out.println("  </ENTRY>");
    out.println("</HDML>");
                    }
                    else if (Integer.parseInt(req.getParameter("label"))==1)
                    {
    int i = Integer.parseInt(req.getParameter("val"));
    jemit.setVariable( "Red",new Integer(i));
                res.sendRedirect("http://"+req.getServerName()+":"+req.getServerPort()+""+req.getRe
        questURI()+"#menu");
                    }
                    else if (Integer.parseInt(req.getParameter("label"))==2)
                    {
    int i = Integer.parseInt(req.getParameter("val"));
    jemit.setVariable( "Green",new Integer(i));
```

-continued

```
            res.sendRedirect("http://"+req.getServerName()+":"+req.getServerPort()+""+req.getRequestURI()+"#menu");
                }
            }
            catch (Exception e)
            {
                out.println(e);
            }
        }
    protected void finalize()
        {
        System.out.println("finalize() Called");
        try
        {
          jemit.disconnect();
        }
        catch(Exception e)
        {
            System.out.println("Exception disconnecting: "+e);
        }
       }
    }
}
```

As illustrated, the above example connects to and controls the EMIT®-enabled Hitachi H8 SDK board using emGateway™ software and a Java servlet. The above example pulls the values of the red and green LEDs and the rotary knob, and displays them on the wireless device. The following examples use a servlet and WML.

```
import java.io.*;
import javax.servlet.*;
import javax.servlet.http.*;
import java.awt.*;
import java.util.*;
import java.awt.event.*;
import emJava20.emCore.*;
import com.emWare.emClient.*;
import com.emWare.emAWT.*;
public class emitsdkwml extends HttpServlet
{
    JEmit jemit;
    public emitsdkwml()
    {
        jemit = new JEmit();
        try
        {
            jemit.setHost("10.1.1.29");
            jemit.setPort(88);
            /*
            jemit.setUsername("Username goes here if Nec.");
            jemit.setPassword("Password Goes here if Nec.");
            */
            jemit.setDevice("d=005040000001");
            jemit.connect();
        }
        catch (Exception e)
        {
            System.out.println("Connecting: "+ e);
        }
        try
        {
            jemit.poll();
        }
        catch (Exception e)
        {
            System.out.println("Starting poll: "+e);
        }
    }
    public void doGet(HttpServletRequest req, HttpServletResponse res) throws ServletException,
    IOException
    {
        res.setContentType("text/vnd.wap.wml");
        PrintWriter out = res.getWriter();
        try
        {
```

-continued

```
        Short redObj = (Short)jemit.getVariable("Red");
        short red Valdrt = redObj.shortValue();
        int red Vallnt = redValdrt;
        String redVal = Integer.toString(redVallnt);
        Short greenObj = (Short)jemit.getVariable("Green");
        short greenValdrt = greenObj.shortValue();
        int greenVallnt = greenValdrt;
        String greenVal = Integer.toString(greenVallnt);
        Short knobObj = (Short)jemit.getVariable("Knob");
        short knobValdrt = knobObj.shortValue();
        int knobVallnt = knobValdrt;
        String knobVal = Integer.toString(knobVallnt);
        if (req.getParameter("page")==null)
            {
                writeIndex(out);
            }
            else if (req.getParameter("page").equals("Menu"))
            {
                writeMenu(out, redVal, greenVal, knobVal);
            }
            else if (req.getParameter("page").equals("Polled"))
            {
                writePolled(out, redVal, greenVal, knobVal);
            }
            else if (req.getParameter("page").equals("ChangeRed"))
            {
                writeChangeRed(out, redVal);
            }
            else if (req.getParameter("page").equals("ChangeGreen"))
            {
                writeChangeGreen(out, greenVal);
        }
        else if (req.getParameter("page").equals("ChangeMode"))
        {
                writeChangeMode(out);
        }
        else if (req.getParameter("page").equals("Both"))
        {
            if (req.getParameter("Min") != null)
                {
                    int i = Integer.parseInt(req.getParameter("Min"));
                    jemit.setVariable( "Red",new Integer(i));
                    jemit.setVariable( "Green",new Integer(i));
                    res.sendRedirect("?page=Menu");
                }
                else if (req.getParameter("Max") != null)
                {
                    int i = Integer.parseInt(req.getParameter("Max"));
                    jemit.setVariable( "Red",new Integer(i));
                    jemit.setVariable( "Green",new Integer(i));
                    res.sendRedirect("?page=Menu");
                }
        }
        else if (req.getParameter("page").equals("SetRed"))
        {
                if
(!(req.getParameter("redVal").equals(""))&&((Integer.parseInt(req.getParameter("redVal"))>=0)&&(Integ
er.parseInt(req.getParameter("redVal"))<=255)))
                    {
                        int i = Integer.parseInt(req.getParameter("redVal"));
                        jemit.setVariable( "Red",new Integer(i));
                        res.sendRedirect("?page=Menu");
                    }
                    else
                    {
                        res.sendRedirect("?page=Error");
                    }
        }
        else if (req.getParameter("page").equals("SetGreen"))
        {
                if
(!(req.getParameter("greenVal").equals(""))&&((Integer.parseInt(req.getParameter("greenVal"))>=0)&&(
Integer.parseInt(req.getParameter("greenVal"))<=255)))
                    {
                        int i = Integer.parseInt(req.getParameter("greenVal"));
                        jemit.setVariable( "Green",new Integer(i));
                        res.sendRedirect("?page=Menu");
                    }
                    else
```

-continued

```
            {
                    res.sendRedirect("?page=Error");
            }
        }
    else if (req.getParameter("page").equals("SetMode"))
    {
        int i = Integer.parseInt(req.getParameter("Mode"));
        jemit.setVariable( "ChgMode",new Integer(i));
        res.sendRedirect("?page=Menu");
    }
    else if (req.getParameter("page").equals("Error"))
    {
        writeError(out);
    }
    }
    catch (Exception e)
    {
    out.println(e);
    }
    }
    public void writeIndex(PrintWriter out)
    {
        // Begin wml page: "Index"
////////////////////////////////////////////////////////////////////////////////
        out.println("<?xml version=\"1.0\"?>");
        out.println("<!DOCTYPE wml PUBLIC \"-//WAPFORUM//DTD WML 1.1//EN\"");
        out.println("            \"http://www.wapforum.org/DTD/wml_1.1.xml\">");
        out.println("<wml>");
        out.println("<!-############### Index ####################-> ");
        out.println("<head>");
        out.println("<meta http-equiv=\"Cache-Control\"content=\"max-age=0\"/>");
        out.println("</head>");
        out.println("<card>");
        out.println(" <do type=\"accept\">");
        out.println("     <go method=\"post\" href=\"emitsdkwml?page=Menu\"/>");
        out.println(" </do>");
        out.println(" <p align=\"center\">");
        out.println(" Welcome to <br/>");
        out.println(" the EMWARE<br/>");
        out.println(" SDK Demo<br/>");
        out.println(" Press OK to go to the menu page.");
        out.println(" </p>");
        out.println("</card>");
        out.println("</wml>");
////////////////////////////////////////////////////////////////////////////////
        // End wml page: "Index"
    }
    public void writeMenu(PrintWriter out, String redVal, String greenVai, String knobVal)
    {
        // Begin wml page: "Menu"
////////////////////////////////////////////////////////////////////////////////
        out.println("<?xml version=\"1.0\"?>");
        out.println("<!DOCTYPE wml PUBLIC \"-//WAPFORUM//DTD WML 1.1//EN\"");
        out. println("            \"http://www.wapforum.org/DTD/wml_1.1.xml\">");
        out.println("<wml>");
        outprintln("<head>");
        out.println("<meta http-equiv=\"Cache-Control\"content=\"must-revalidate\"/>");
        out.println("<meta http-equiv=\"Cache-Control\"content=\"no-cache\"/>");
        out.println("</head>");
        out.println("");
        out.println("<card>");
        out.println("     <p>Red LED: "+redVal+"");
        out.println(" <br/>Green LED: "+greenVal+"");
        out.println(" <br/>Knob Value: "+knobVal+"");
        out.println(" <br/>");
        out.println("     <anchor title=\"Polled\"><go method=\"post\" href=\"emitsdkwml?page=Polled\">");
        out.println("         </go>Polled Values</anchor><br/>");
        out.println("         <anchor          title=\"Red\"><go     method=\"post\" href=\"emitsdkwml?page=ChangeRed\">");
        out.println("             </go>Change Red LED</anchor><br/>");
        out.println("             <anchor          title=\"Green\"><go     method=\"post\" href=\"emitsdkwml?page=ChangeGreen\">");
        out.println("                 </go>Change Green LED</anchor><br/>");
        out.println("                 <anchor          title=\"Mode\"><go     method=\"post\" href=\"emitsdkwml?page=ChangeMode\">");
        out.println("                     </go>Change Mode</anchor><br/>");
        out.println("                     <anchor          title=\"Min\"><go     method=\"post\" href=\"emitsdkwml?page=Both&Min=0\">");
        out.println("                         </go>Set Both to Min</anchor><br/>");
```

-continued

```
        out.println("            <anchor         title=[|]P'Max[|]       method=\"post\"
                                                P'><go
href=\"emitsdkwml?page=Both&Max=255\">");
        out.println("            </go>Set Both to Max</anchor><br/>");
        out.println(" </p>");
        out.println("</card>");
        out.println("</wml>");
///////////////////////////////////////////////////////////////////////////////////////
        // End wml page: "Menu"
    }
    public void writePolled(PrintWriter out, String redVal, String greenVal, String knobVal)
    {
        // Begin wml page: "Polled"
///////////////////////////////////////////////////////////////////////////////////////
        out.println("<?xml version=\"1.0\"?>");
        out.println("<!DOCTYPE wml PUBLIC \"-//WAPFORUM//DTD WML 1.1//EN\"");
        out.println("            \"http://www.wapforum.org/DTD/wml_1.1.xml\">");
        out.println("<wml>");
        out.println("<head>");
        out.println("<meta http-equiv=\"Cache-Control\"content=\"must-revalidate\"/>");
        out.println("<meta http-equiv=\"Cache-Control\"content=\"no-cache\"/>");
        out.println("</head>");
        out.println("");
        out.println("<card ontimer=\"emitsdkwml?page=Polled\">");
        outprintln("timer value=\"50\"/>");
        out.println("<do type=\"accept\" label=\"Menu\">");
        out.println("       <go method=\"post\"href=\"emitsdkwml?page=Menu\"/>");
        out.println(" </do>");
        out.println("       <p>Red LED: "+redVal+"");
        out.println("          <br/>Green LED: "+greenVal+"");
        out.println("          <br/>knob Value: "+knobVal+"");
        out.println("       </p>");
        out.println("</card>");
        out.println("</wml>");
        out.println(" ");
///////////////////////////////////////////////////////////////////////////////////////
        // End wml page: "Polled"
    }
    public void writeChangeRed(PrintWriter out, String redVal)
    {
        // Begin wml page: "ChangeRed"
///////////////////////////////////////////////////////////////////////////////////////
        out.println("<?xml version=\"1.0\"?>");
        out.println("<!DOCTYPE wml PUBLIC \"-//WAPFORUM//DTD WML 1.1//EN\"");
        out.println("            \"http://www.wapforum.org/DTD/wml_1.1.xml\">");
        out.println("<wml>");
        out.println("<head>");
        out.println("<meta http-equiv=\"Cache-Control\"content=\"must-revalidate\"/>");
        out.println("<meta http-equiv=\"Cache-Control\"content=\"no-cache\"/>");
        out.println("</head>");
        out.println("");
        out.println("<card>");
        out.println(" <do type=\"accept\"label=\"Enter\">");
        out.println("            <go method=\"post\"href=\"emitsdkwml?page=SetRed&redVal=$red\">");
        out.println("            >/go<");
        out.println(" </do>");
        out.println("       <p>Red LED: "+redVal+"");
        out.println("          <br/>Enter new value<br/>");
        out.println("         *Must be between 0 and 255");
        out.println("          <input name=\"red\"format=\"*N\"maxlength=\"3\"/>");
        out.println("       </p>");
        out.println("</card>");
        out.println("</wml>");
///////////////////////////////////////////////////////////////////////////////////////
        // End wml page: "ChangeRed"
    }
    public void writeChangeGreen(PrintWriter out, String greenVal)
    {
        // Begin wml page: "ChangeGreen"
///////////////////////////////////////////////////////////////////////////////////////
        out.println("<?xml version=\"1.0\"?>");
        out.println("<!DOCTYPE wml PUBLIC \"-//WAPFORUM//DTD WML 1.1//EN\"");
        out.println("            \"http://www.wapforum.org/DTD/wml_1.1.xml\">");
        out.println("<wml>");
        out.println("<head>");
        out.println("<meta http-equiv=\"Cache-Control\"content=\"must-revalidate\"/>");
        out.println("<meta http-equiv=\"Cache-Control\"content=\"no-cache\"/>");
        out.println("</head>");
        out.println("");
```

```
        out.println("<card>");
        out.println(" <do type=\"accept\"label=\"Enter\">");
        out.println("        <go                              method=\"post\"
href=\"emitsdkwml?page=SetGreen&greenVal=$green\">");
        out.println("            >/go<");
        out.println("        </do>");
        out.println("    <p>Green LED: "+greenVal+"");
        out.println("        <br/>Enter new value<br/>");
        out.println("        *Must be between 0 and 255");
        out.println("        <input name=\"green\"format=\"*N\"maxlength=\"3\"/>");
        out.println("    </p>");
        out.println("</card>");
        out.println("</wml>");
        /////////////////////////////////////////////////////////////////////
        // End wml page: "ChangeGreen"
    }
    public void writeChangeMode(PrintWriter out)
    {
        // Begin wml page: "ChangeMode"
        /////////////////////////////////////////////////////////////////////
        out.println("<?xml version=\"1.0\"?>");
        out.println("<!DOCTYPE wml PUBLIC \"-//WAPFORUM//DTD WML 1.1//EN\"");
        out.println("        \"http://www.wapforum.org/DTD/wml_1.1.xml\">");
        out.println("<wml>");
        out.println("<head>");
        out.println("<meta http-equiv=\"Cache-Control\"content=\"must-revalidate\"/>");
        out.println("<meta http-equiv=\"Cache-Control\"content=\"no-cache\"/>");
        out.println("</head>");
        out.println("");
        out.println("<card>");
        out.println(" <do type=\"option\"label=\"Menu\">");
        out.println("        <go method=\"post\"href=\"emitsdkwml?page=Menu\">");
        out.println("        </go>");
        out.println("    </do>");
        out.println("    <p>");
        out.println("                <anchor      title=\"Local\"><go  method=\"post\"
href=\"emitsdkwml?page=SetMode&Mode=0\">");
        out.println("            </go>Local Control</anchor><br />");
        out.println("            <anchor         title=\"Phone\"><go   method=\"post\"
href=\"emitsdkwml?page=SetMode&Mode=3\">");
        out.println("        </go>Phone Control</anchor><br/>");
        out.println("    </p>");
        out.println("</card>");
        out.println("</wml>");
        /////////////////////////////////////////////////////////////////////
        // End wml page: "Changemode"
    }
    pubiic void writeError(PrintWriter out)
    {
        // Begin wml page: "Error"
        /////////////////////////////////////////////////////////////////////
        out.println("<?xml version=\"1.0\"?>");
        out.println("<!DOCTYPE wml PUBLIC \"-//WAPFORUM//DTD WML 1.1 //EN\"");
        out.println("            \"http://www.wapforum.org/DTD/wml_1.1.xml\">");
        out.println("<wml>");
        out.println("<!-############## Error ###################-> ");
        out.println("<head>");
        out.println("<meta http-equiv=\"Cache-Control\"content=\"max-age=0\"/>");
        out.println("</head>");
        out.println("<card>");
        out.println(" <do type=\"accept\">");
        out.println("    <go method=\"post\"href=\"emitsdkwml?page=Menu\"/>");
        out.println(" </do>");
```

-continued

```
        outprintln(" <p<");
        out.println("Value entered must be between 0 and 255<br/> <br/>");
        out.println(" Please press OK to return to Menu ");
        out.println(" </p>");
        out.println("</card>");
        out.println("</wml>");
        //////////////////////////////////////////////////////////////////////////////////
        // End wml page: "Error"
    }
    protected void finalize()
    {
        System.out.println("finalize() Called");
        try
        {
            jemit.disconnect();
        }
        catch(Exception e)
        {
            System.out.println("Exception disconnecting: "+e);
        }
    }
}
```

The foregoing examples may be used in conjunction with an Apache web server and Caucho's Resin Java Servlet Engine, as discussed below. If the Apache web server and the gateway product available from emWare are to be installed on the same computer, one of them is to be associated with a port other than port 80 because they do not share this port.

HTTP Tunneling Example

The following example is an example showing HTTP Tunneling and demonstrating how to use a Java applet to communicate with a Java servlet, which in turn will communicate with a device on emWare's emGateway™ product of EMIT 4.0. The following pieces of source code will be referred to in the description. The following code will be referred to as the file AppServDemo.html.

```
<html>
<head>
<title>Applet To Servlet Communication Demo</title>
<head>
<body bgcolor="#000000">
    <applet name="demoAppToServ" width="403" height="439"
        code="AppToServlet.class" archive="demoAppToServlet.jar">
        <param name="servleturl" value="http://10.1.1.28:80/servlet/EmitServlet4">
    </applet>
</body>
</html>
```

The following source code will be referred to as the file AppToServlet.java. In this example, the following applet communicates with EmitServlet via HTTP Tunneling which will communicate with the emGateway™ software.

```
// java imports
import java.io.*;
import java.net.*;
```

```java
import java.awt.*;
import java.applet.*;
import java.awt.event.*;

// emWare imports
import emJava20.emCore.*;
import emJava20.emClient.*;
import emJava20.emAWT.emBevelPanel;
import emJava20.emDisplays.emBarDisplay;
import emJava20.emSliders.emKnob;
import emJava20.emAWT.emTransparentPanel;
import emJava20.emSwitches.emLEDSwitch;

public class AppToServlet extends Applet implements java.awt.event.ActionListener
{
boolean appletRunning = true;//flag if this applet is running
int mode;        // used to track the value of the device mode
DeviceSettings devSettings;//object that represents the device status values
ServletMonitor serMonitor;  //thread that provides communication to the servlet
GreenLedListener greLedListener;  // listens for changes to the Green LED in this applet
RedLedListener redLedListener;   // listens for changes to the Red LED in this applet
ModeListener modeListener;      // listens for changes to the Mode in this applet
ButtonListener buttonListener;   // listens for the Button push in this applet
/////////////////////////////////////////////////////////////
// BEGIN declare emObject controls for visual layout
emJava20.emAWT.emBevelPanel emBevelPanel1   = new emJava20.emAWT.emBevelPanel();
emJava20.emSliders.emKnob      redKnob       = new emJava20.emSliders.emKnob();
emJava20.emSliders.emKnob      greenKnob     = new emJava20.emSliders.emKnob();
emJava20.emAWT.emBevelPanel    emBevelPanel2 = new emJava20.emAWT.emBevelPanel();
emJava20.emDisplays.emBarDisplay greenBarDisplay = new emJava20.emDisplays.emBarDisplay();
emJava20.emDisplays.emBarDisplay redBarDisplay   = new emJava20.emDisplays.emBarDisplay();
emJava20.emAWT.emBevelPanel    emBevelPanel3 = new emJava20.emAWT.emBevelPanel();
emJava20.emSwitches.emLEDSwitch  localSwitch    = new emJava20.emSwitches.emLEDSwitch();
emJava20.emSwitches.emLEDSwitch  recordSwitch   = new emJava20.emSwitches.emLEDSwitch();
emJava20.emSwitches.emLEDSwitch  remoteSwitch   = new emJava20.emSwitches.emLEDSwitch();
emJava20.emSwitches.emLEDSwitch  playbackSwitch = new emJava20.emSwitches.emLEDSwitch();
emJava20.emAWT.emBevelPanel    emBevelPanel5 = new emJava20.emAWT.emBevelPanel();
emJava20.emCore.emVariable     redVariable    = new emJava20.emCore.emVariable();
emJava20.emCore.emVariable     greenVariable  = new emJava20.emCore.emVariable();
// END declare controls /* init() ------------------------------------
  called by the browser or applet viewer to inform this applet that it has been loaded  into the system...
  initializes the applet
------------------------------------*/
    public void init()
    {
```

```
// instantiate the DeviceSettings object
devSettings = new DeviceSettings();
// instantiate the ServletMonitor thread [with this applet and the devSettings object]
serMonitor = new ServletMonitor(this, devSettings);
// cause the serMonitor thread to begin execution
serMonitor.start();
// instantiate the object for each of the listeners
greLedListener = new GreenLedListener(this, serMonitor);
redLedListener = new RedLedListener(this, serMonitor);
modeListener   = new ModeListener(this, serMonitor);
buttonListener = new ButtonListener(this, serMonitor);
////////////////////////////////////////////////////////////
// BEGIN initializing the visual layout/controls of this applet
setLayout(null);
setBackground(java.awt.Color.black);
setSize(403,439);
// Bevel PanelI
emBevelPanel1.setBorderInsets(new java.awt.Insets(5,5,5,5));
emBevelPanel1.setLabel("LED Control");
emBevelPanel1.setLabelVisible(true);
emBevelPanel1.setLayout(null);
add(emBevelPanel1);
emBevelPanel1.setBackground(java.awt.Color.lightGray);
emBevelPanel1.setBounds(25,55,145,275);
// Red Knob
redKnob.setKnobBevelThickness(3);
redKnob.setMaxEventRate(255);
redKnob.setLabelVisible(true);
redKnob.setLabel("Red");
redKnob.setLabelPosition(1);
redKnob.setUpdateContinuously(true);
redKnob.setMax(255);
emBevelPanel1.add(redKnob);
redKnob.setBackground(java.awt.Color.white);
redKnob.setForeground(java.awt.Color.black);
redKnob.setBounds(5,5,115,115);
// Green Knob
greenKnob.setKnobBevelThickness(3);
greenKnob.setLabelVisible(true);
greenKnob.setLabel("Green");
greenKnob.setLabelPosition(1);
greenKnob.setUpdateContinuously(true);
greenKnob.setMax(255);
emBevelPanel1.add(greenKnob);
greenKnob.setBackground(java.awt.Color.white);
greenKnob.setForeground(java.awt.Color.black);
greenKnob.setBounds(5,125,115,115);
```

```
// Bevel Panel 2
emBevelPanel2.setBorderInsets(new java.awt.Insets(5,5,5,5));
emBevelPanel2.setLabel("LED Display");
emBevelPanel2.setLabelVisible(true);
emBevelPanel2.setLayout(null);
add(emBevelPanel2);
emBevelPanel2.setBackground(java.awt.Color.lightGray);
emBevelPanel2.setBounds(170,55,210,275);
// Green Bar Display
greenBarDisplay.setLabel("Green");
greenBarDisplay.setThresholdVisible(false);
greenBarDisplay.setThreshold2Color(java.awt.Color.green);
greenBarDisplay.setThreshold1Color(java.awt.Color.green);
greenBarDisplay.setLabelVisible(true);
greenBarDisplay.setMinMaxVisible(false);
greenBarDisplay.setMax(255);
emBevelPanel2.add(greenBarDisplay);
greenBarDisplay.setBackground(java.awt.Color.white);
greenBarDisplay.setForeground(java.awt.Color.black);
greenBarDisplay.setBounds(96,5,90,235);
// Red Bar Display
redBarDisplay.setThreshold0Color(java.awt.Color.red);
redBarDisplay.setLabel("Red");
redBarDisplay.setThresholdVisible(false);
redBarDisplay.setThreshold1Color(java.awt.Color.red);
redBarDisplay.setLabelVisible(true);
redBarDisplay.setMinMaxVisible(false);
redBarDisplay.setMax(255);
emBevelPanel2.add(redBarDisplay);
redBarDisplay.setBackground(java.awt.Color.white);
redBarDisplay.setForeground(java.awt.Color.black);
redBarDisplay.setBounds(5,5,90,235);
// Bevel Panel 3
emBevelPanel3.setBorderInsets(new java.awt.Insets(5,5,5,5));
emBevelPanel3.setLabel("Change Mode");
emBevelPanel3.setLabelVisible(true);
emBevelPanel3.setLayout(null);
add(emBevelPanel3);
emBevelPanel3.setBackground(java.awt.Color.lightGray);
emBevelPanel3.setBounds(25,330,355,85);
// Local Switch
localSwitch.setActiveLabel("Local");
localSwitch.setInactiveLabel("Local");
emBevelPanel3.add(localSwitch);
localSwitch.setBackground(java.awt.Color.white);
localSwitch.setBounds(5,5,70,45);
// Record Switch
```

```
        recordSwitch.setActiveLabel("Record");
        recordSwitch.setInactiveLabel("Record");
        emBevelPanel3.add(recordSwitch);
        recordSwitch.setBackground(java.awt.Color.white);
        recordSwitch.setBounds(90,5,70,45);
        remoteSwitch.setActiveLabel("Remote");
        remoteSwitch.setInactiveLabel("Remote");
        emBevelPanel3.add(remoteSwitch);
        // Remote Switch
        remoteSwitch.setBackground(java.awt.Color.white);
        remoteSwitch.setBounds(260,5,70,45);
        // Playback Switch
        playbackSwitch.setMomentary(true);
        playbackSwitch.setActiveLabel("Playback");
        playbackSwitch.setInactiveLabel("Playback");
        emBevelPanel3.add(playbackSwitch);
        playbackSwitch.setBackground(java.awt.Color.white);
        playbackSwitch.setBounds(175,5,70,45);
        // Bevel Panel 5
        emBevelPanel5.setBorderInsets(new java.awt.Insets(5,5,5,5));
        emBevelPanel5.setLabel("emWare SDK Demo Control Panel");
        emBevelPanel5.setLabelVisible(true);
        emBevelPanel5.setLayout(null);
        add(emBevelPanel5);
        emBevelPanel5.setBackground(java.awt.Color.lightGray);
        emBevelPanel5.setFont(new Font("Dialog", Font.BOLD, 20));
        emBevelPanel5.setBounds(12,12,380,415);
        // Red and Green Variable
        redVariable.setVariableName("Red");
        greenVariable.setVariableName("Green");
        // END initializing the visual layout/controls
        // BEGIN register listeners
        /* when an event is performed on these listners
                the method actionPerformed() is called */
        redVariable.addActionListener(this);
        greenVariable.addActionListener(this);
        localSwitch.addActionListener(this);
        recordSwitch.addActionListener(this);
        playbackSwitch.addActionListener(this);
        remoteSwitch.addActionListener(this);
        redKnob.addActionListener(this);
        greenKnob.addActionListener(this);
        // END register listeners
}

/* destroy() ----------------------------------
        called by the browser or applet viewer to inform this applet that it is being
```

```
                reclaimed and that it should destroy any resources that it has allocated.
---------------------------------------------------------*/
        public void destroy()
        {
                appletRunning = false;
                try
                {
                        Thread.sleep(1000);
                }
                catch (Exception e)      {}
                devSettings = null;
                serMonitor = null;
                greLedListener = null;
                redLedListener = null;
                modeListener = null;
                System.gc(); // run the system garbage collector
                try
                {
                        Thread.sleep(1000);
                }
                catch (Exception e)      {}
        }

/* processEvent() ----------------------------
        processes events for this applet
----------------------------------------- */
        public void processEvent(String deviceVar, int val)
        {
                /* if deviceVar is "Mode" then call internal
                        function set_mode() to set mode to val
                */
                if( deviceVar.equals("Mode") )
                {
                        set_mode(val);
                }

/* if deviceVar is "Red" then set the redBarDisplay to val...
                        ...and if mode is zero then set redKnob to val
                */
                else if( deviceVar.equals("Red") )
                {
                        redBarDisplay.setValue(val);
                        if( mode == 0 ) redKnob.setValue(val);
                }

/* if deviceVar is "Green" then set the greenBarDisplay to val...
                        ...and if mode is zero then set greenKnob to val
```

```
            */
            else if( deviceVar.equals("Green") )
            {
                    greenBarDisplay.setValue(val);
                    if( mode == 0 ) greenKnob.setValue(val);
            }
    }

/* set_mode() --------------------------------
    changes the value of mode and makes
    all necessary changes to the applet
    -------------------------------------------- */
    private void set_mode(int newMode)
    {
            mode = newMode;  // set the global device mode to newMode /* set knobs and switchs on the applet to
                    reflect the new state of the device mode
            */
            switch(newMode)
            {
                    case 0: /* Local Mode:
    set local switch active and all others inactive    */
                            greenKnob.setEnabled(false);
                            redKnob.setEnabled(false);
                            localSwitch.setActive(true);
                            recordSwitch.setActive(false);
                            playbackSwitch.setActive(false);
                            remoteSwitch.setActive(false);
                            break;
                    case 1: /* Record Mode:
    set record switch active and all others inactive
                            */
                            greenKnob.setEnabled(false);
                            redKnob.setEnabled(false);
                            localSwitch.setActive(false);
                            recordSwitch.setActive(true);
                            playbackSwitch.setActive(false);
                            remoteSwitch.setActive(false);
                            break;
                    case 2: /* Playback Mode:
    set playback switch active and all others inactive
                            */
                            greenKnob.setEnabled(false);
                            redKnob.setEnabled(false);
                            localSwitch.setActive(false);
                            recordSwitch.setActive(false);
```

```
                    playbackSwitch.setActive(true);
                    remoteSwitch.setActive(false);
                    break;
        case 3: /* Remote Mode:
                            set green and red knobs active,
                            set remote switch active,
                            and all others inactive
                    */
                    greenKnob.setEnabled(true);
                    redKnob.setEnabled(true);
                    localSwitch.setActive(false);
                    recordSwitch.setActive(false);
                    playbackSwitch.setActive(false);
                    remoteSwitch.setActive(true);
        }
}

/* actionPerformed() ---------------------------------
called when an event is performed on any of the
listeners, which were defined in the init() method above
-------------------------------------------------------- */
public void actionPerformed(java.awt.event.ActionEvent event)
{
        /* call the appropriate actionPerformed method
associated with the object of this event... each of the actionPerformed methods are defined
below
        */
        Object object = event.getSource();
        if (object == redVariable)
                redVariable_actionPerformed(event);
        else if (object == greenVariable)
                greenVariable_actionPerformed(event);
        else if (object == localSwitch)
                localSwitch_actionPerformed(event);
        else if (object == recordSwitch)
                recordSwitch_actionPerformed(event);
        else if (object == playbackSwitch)
                playbackSwitch_actionPerformed(event);
        else if (object == remoteSwitch)
                remoteSwitch_actionPerformed(event);
        else if (object == redKnob)
                redKnob_actionPerformed(event);
        else if (object == greenKnob)
                greenKnob_actionPerformed(event);
}

/* redVariable_actionPerformed() ----------------
```

```
called when an event is performed
on the redVariable action listener
------------------------------------------ */
void redVariable_actionPerformed(java.awt.event.ActionEvent event)
{
        try
        {
                redBarDisplay.setValue(redVariable.getIntValue());
                redKnob.setValue(redVariable.getIntValue());

/* set the red value in the ServletMonitor class
                        so that the next time the serMonitor thread
                        communicates to the servlet it will change the
                        value of the red variable on the device.
                */
                serMonitor.red = redVariable.getIntValue();
        }
        catch (java.lang.Exception e) {}
}

/* greenVariable_actionPerformed() -----------------
called when an event is performed
on the greenVariable action listener
------------------------------------------------- */
void greenVariable_actionPerformed(java.awt.event.ActionEvent event)
{
        try
        {
                greenBarDisplay.setValue(greenVariable.getIntValue());
                greenKnob.setValue(greenVariable.getIntValue());

/* set the green value in the ServletMonitor class
                        so that the next time the serMonitor thread
                        communicates to the servlet it will change the
                        value of the green variable on the device.
                */
                serMonitor.green = greenVariable.getIntValue();
        }
        catch (java.lang.Exception e) {}
}

/* localSwitch_actionPerformed() --------
called when an event is performed
on the localSwitch action listener
------------------------------------ */
void localSwitch_actionPerformed(java.awt.event.ActionEvent event)
{
```

```
/* if localSwitch is NOT already active and if the
        mode value is two then set localSwitch TRUE...
*/
if( !localSwitch.isActive() && mode == 3 )
        localSwitch.setActive(true);

/* set mode value to zero,
        call invokeFunction() method of the modeListener class,
        and then set all other switches false
*/
mode = 0;
modeListener.invokeFunction(mode);
recordSwitch.setActive(false);
playbackSwitch.setActive(false);
remoteSwitch.setActive(false);
}

/* recordSwitch_actionPerformed() ----------
called when an event is performed
on the recordSwitch action listener
---------------------------------------- */
void recordSwitch_actionPerformed(java.awt.event.ActionEvent event)
{
        /* if recordSwitch is NOT already active and if the
                mode value is one then set recordSwitch TRUE...
        */
        if( !recordSwitch.isActive() && mode == 1 )
                recordSwitch.setActive(true);

/* otherwise...
                set mode value to one,
                call invokeFunction() method of the modeListener class,
                set all other switches false,
                and then call buttonListener() method of the
                        setVariable class, which will activate
                        record functionality on the device
        */
        else
        {
                mode = 1;
                modeListener.invokeFunction(mode);
                localSwitch.setActive(false);
                playbackSwitch.setActive(false);
                remoteSwitch.setActive(false);
                buttonListener.setVariable(1);
        }
}
```

```
/* playbackSwitch_actionPerformed() ------------
called when an event is performed
on the playbackSwitch action listener
-------------------------------------------- */
void playbackSwitch_actionPerformed(java.awt.event.ActionEvent event)
{
        /* if playbackSwitch is NOT already active and if the
                mode value is two then set playbackSwitch TRUE...
        */
        if( !playbackSwitch.isActive() && mode == 2 )
                playbackSwitch.setActive(true);

/* otherwise...
                set mode value to two,
                call invokeFunction() method of the modeListener class,
                set all other switches false,
                and then call buttonListener() method of the
                        setVariable class, which will activate
                        playback functionality on the device
        */
        else
        {
                mode = 2;
                modeListener.invokeFunction(mode);
                localSwitch.setActive(false);
                recordSwitch.setActive(false);
                remoteSwitch.setActive(false);
                buttonListener.setVariable(1);
        }
}

/* remoteSwitch_actionPerformed() ------------
called when an event is performed
on the remoteSwitch action listener
-------------------------------------------- */
void remoteSwitch_actionPerformed(java.awt.event.ActionEvent event)
{
        /* if remoteSwitch is NOT already active and if the
                mode value is two then set remoteSwitch TRUE...
        */
        if( !remoteSwitch.isActive() && mode == 3 )
                remoteSwitch.setActive(true);

/* set mode value to three,
                call invokeFunction() method of the modeListener class,
                and then set all other switches false
```

```
            */
            mode = 3;
            modeListener.invokeFunction(mode);
            localSwitch.setActive(false);
            playbackSwitch.setActive(false);
            recordSwitch.setActive(false);
}

/* redKnob_actionPerformed() ----------------
called when an event is performed
on the redKnob action listener
---------------------------------------- */
void redKnob_actionPerformed(java.awt.event.ActionEvent event)
{
        try
        {
                redVariable.setIntValue(redKnob.getValue());
        }
        catch (java.lang.Exception e) {}
}

/* greenKnob_actionPerformed() ----------------
called when an event is performed
on the greenKnob action listener
---------------------------------------- */
void greenKnob_actionPerformed(java.awt.event.ActionEvent event)
{
        try
        {
                greenVariable.setIntValue(greenKnob.getValue());
        }
        catch (java.lang.Exception e) {}
}
// BEGIN INNER CLASSES /* class ServletMonitor ------------------------
separate thread that monitors the servlet
for changes and sends any changes made in
this applet via HTTP
---------------------------------------- */
class ServletMonitor extends Thread
{
        public int
                green = -1,
                red = -1,
                mode = -1,
                button = -1;
```

```
public int
        greenOldFromServer = -1,
        redOldFromServer = -1,
        modeOldFromServer = -1;

public int
        greenNewFromServer = -1,
        redNewFromServer = -1,
        modeNewFromServer = -1;

AppToServlet theApplet;
DeviceSettings devSettings;

public ServletMonitor(AppToServlet app, DeviceSettings ds)
{
        theApplet = app;
        devSettings = ds;
}

/* ServletMonitor Member Function: run() -----------
   called when this thread is started
   ------------------------------------------------ */
public void run()
{
        String s;
        String servletURL;

URL u;
        URLConnection urlc;
        BufferedReader in;

// get the URL of the EMIT activated servlet
        servletURL = getParameter("servleturl");

/* if getParameter("servleturl") returned
                null then hard code the servletURL
                NOTE: the servlet URL MUST be an absolute URL!!!
        */
        if (servletURL == null) servletURL = "http://10.1.1.28:80/servlet/EmitServlet";

try
        {
                while (theApplet.appletRunning)
                {
                        /* if remote mode is active then get the green
                                and red values from the green and red knobs
```

```
                            */
                            if (theApplet.mode == 3)
                            {
                                    green = theApplet.greenKnob.getValue();
                                    red = theApplet.redKnob.getValue();
                            }

/* declare a new URL object in which
                                    we will pass the values of the
                                    device variables in a query string
                            */
                            s =
("green="+green+"&red="+red+"&mode="+mode+"&button="+button);
                            u = new URL(servletURL+"?"+s);

// BEGIN Servlet communication
                    /* assign to 'urlc' a URLConnection object that represents a
connection to the remote object referred to by the URL object */
                            urlc = u.openConnection();

/*set the value of doOutput field for this URLConnection to false...
A URL connection can be used for input and/or output.
Setting the doOutput flag to false indicates that the application
does NOT intend to write data to the URL connection. */
                            urlc.setDoOutput(false);

/* set the value of doInput field for this URLConnection to true...
        A URL connection can be used for input and/or output.
Setting the doInput flag to true indicates that the application
intends to read data from the URL connection. */
                            urlc.setDoInput(true);

/*set value of allowUserInteraction of this URLConnection to false.
If allowUserInteraction is set to false then no user interaction is allowed. */
                            urlc.setAllowUserInteraction(false);

/* assign to 'in' a BufferedReader object that reads text from the
                    character-input stream received from the InputStream of
the URLConnection -- buffering characters so as to provide
for the efficient reading of characters, arrays, and lines. */
                                    in = new BufferedReader(new
InputStreamReader(urlc.getInputStream()));

/* assign to 's' a String containing the contents of the next
line of text received from the BufferedReader object */
                                    s = in.readLine();
```

```
                                // close the stream
                                in.close();

// END Servlet communication
        /* call the function serverStringParser() which will parse
           the data received from the BufferedReader object and use
this data to obtain the new values of the devices settings */
                                if (s != null) serverStringParser(s);

// reinitialize the device settings
                                green = -1;
                                red = -1;
                                mode = -1;
                                button = -1;

// THIS IS WHERE THE POLL RATE IS SET;
/* cause this thread to temporarily cease execution for 100 milliseconds...
This thread (ServletMonitor) will initiate communication to the servlet again in 100 milliseconds. If the
thread does not sleep then the continues steam to the server will bog down the efficiency of the servlet.
*/
                                Thread.sleep(100);
                                // END POLL RATE SET
                                //////////////////////////////////////////////////
                        }
                }
                catch(Exception e)
                {
                        System.out.println(e);
                }
        }

/* ServletMonitor Member Function: serverStringParser() ------
parse the input String and use the parsed data
to set the values of the devices settings
------------------------------------------------------- */
        public void serverStringParser(String s)
        {
                int
                        firstEquals,
                        secondEquals,
                        thirdEquals;
                int
                        firstAmpersand,
                        secondAmpersand,
                        thirdAmpersand;

/* find the string index positions of the '=' characters
```

```
used to separate the name=value pair of the devices settings */
                firstEquals = s.indexOf((int) '=', 0);
                secondEquals = s.indexOf((int) '=', (firstEquals+1));
                thirdEquals = s.indexOf((int) '=', (secondEquals+1));

/* find the string index positions of the '&' characters
used to separate the devices settings from the input String */
                firstAmpersand = s.indexOf((int) '&', 0);
                secondAmpersand = s.indexOf((int) '&', (firstAmpersand+1));
                thirdAmpersand = s.indexOf((int) '&', (secondAmpersand+1));

/* assign the new 'green', 'red', and 'mode' values from the server
by parsing input string using the indexed positions found above */
                greenNewFromServer = Integer.parseInt(s.substring((firstEquals+1),
firstAmpersand));
                redNewFromServer = Integer.parseInt(s.substring((secondEquals+1),
secondAmpersand));
                modeNewFromServer = Integer.parseInt(s.substring((thirdEquals+1),
thirdAmpersand));

/* if the new Green value is not the same as the old Green value then process an event in this applet
for the Green device setting... ...and assign greenNewFromServer to greenOldFromServer for the next
run */
                if (greenOldFromServer!=greenNewFromServer)
                {
                        theApplet.processEvent("Green", greenNewFromServer);
                        greenOldFromServer = greenNewFromServer;
                }

/* if the new Red value is not the same as the old Red value then
process an event in this applet for the Red device setting...
.and assign redNewFromServer to redOldFromServer for the next run */
                if (redOldFromServer!=redNewFromServer)
                {
                        theApplet.processEvent("Red", redNewFromServer);
                        redOldFromServer = redNewFromServer;
                }

/* if the new Mode value is not the same as the old Mode value then
process an event in this applet for the Mode device setting....and assign modeNewFromServer to
modeOldFromServer for the next run */
                if (modeOldFromServer!=modeNewFromServer)
                {
                        theApplet.processEvent("Mode", modeNewFromServer);
                        modeOldFromServer = modeNewFromServer;
                }
        }
```

```
}

/* class GreenLedListener ------------------------
   listens for clientside changes to the Green LED
   ------------------------------------------------ */
class GreenLedListener implements ActionListener
{
        AppToServlet theApplet;
        ServletMonitor serMonitor;

public GreenLedListener(AppToServlet app, ServletMonitor sm)
        {
                serMonitor = sm;
                theApplet = app;
        }

/* GreenLedListener Member Function: actionPerformed() -------
           parse the integer value from the command string
           associated with this action... ensure that the value
           is within range... and then set the green value in
           the ServletMonitor class so that the next time the
           serMonitor thread communicates to the servlet it will
           change the value of the red variable on the device
        ----------------------------------------------------- */
        public void actionPerformed(ActionEvent ae)
        {
                int i = Integer.parseInt(ae.getActionCommand());
                if (i < 0 )
                {
                        i = 0;
                }
                else if ( i > 255 )
                {
                        i = 255;
                }
                serMonitor.green = i;
        }
}

/* class RedLedListener ---------------------------
   listens for clientside changes to the Red LED
   ------------------------------------------------ */
class RedLedListener implements ActionListener
{
        AppToServlet theApplet;
        ServletMonitor serMonitor;
```

```java
public RedLedListener(AppToServlet app, ServletMonitor sm)
{
        serMonitor = sm;
        theApplet = app;
}

/* RedLedListener Member Function: actionPerformed() ------
        parse the integer value from the command string
        associated with this action... ensure that the value
        is within range... and then set the red value in
        the ServletMonitor class so that the next time the
        serMonitor thread communicates to the servlet it will
        change the value of the red variable on the device
------------------------------------------------------- */
public void actionPerformed(ActionEvent ae)
{
        int i = Integer.parseInt(ae.getActionCommand());
        if (i < 0 )
        {
                i = 0;
        }
        else if ( i > 255 )
        {
                i = 255;
        }
        serMonitor.red = i;
}
}

/* class ModeListener -------------------------
        listens for clientside changes to the Mode
   ------------------------------------------ */
class ModeListener
{
        AppToServlet theApplet;
        ServletMonitor serMonitor;

public ModeListener(AppToServlet app, ServletMonitor sm)
        {
                serMonitor = sm;
                theApplet = app;
        }

/* ModeListener Member Function: invokeFunction() ----------
        ensure that the value of the input integer is within range... and then set the mode
        value in the ServletMonitor class so that the next time the serMonitor thread
        communicates to the servlet it will change the value of the mode variable on the device
```

```
                                        */
            public void invokeFunction(int i)
            {
                    if (i < 0 )
                    {
                            i = 0;
                    }
                    else if ( i > 3 )
                    {
                            i = 3;
                    }
                    serMonitor.mode = i;
            }
    }

/* class ButtonListener ------------------------
   listens for clientside changes to the Mode
   ------------------------------------------ */
class ButtonListener
{
            AppToServlet theApplet;
            ServletMonitor serMonitor;

public ButtonListener(AppToServlet app, ServletMonitor sm)
            {
                    serMonitor = sm;
                    theApplet = app;
            }

/* ButtonListener Member Function: setVariable() -----------
   ensure that the value of the input integer is within range...
   and then set the button value in the ServletMonitor class
   so that the next time the serMonitor thread communicates
   to the servlet it will change the value of the button
   variable on the device
   ------------------------------------------------------- */
            public void setVariable(int i)
            {
                    if (i != 1 )
                    {
                            i = 1;
                    }
                    serMonitor.button = i;
            }
    }
```

```
/* class DeviceSettings ------------------------------------
        this is a virtual representation of the objects settings/status
------------------------------------------------------- */
    class DeviceSettings
    {
        public int
                greenLed,
                redLed,
                mode,
                knob;

// green
        public int getGreenLed()
        {
            return greenLed;
        }
        public void setGreenLed(int i) // from device
        {
            greenLed = i;
        }

// red
        public int getRedLed()
        {
            return redLed;
        }
        public void setRedLed(int i) // from device
        {
            redLed = i;
        }

// mode
        public int getMode()
        {
            return mode;
        }
        public void setMode(int i) // from device
        {
            mode = i;
        }

// knob
        public int getKnob()
        {
            return knob;
        }
```

```java
            public void setKnob(int i) // from device
            {
                    knob = i;
            }
        }
    // END INNER CLASSES
    ///////////////////////////////////////////////////////////////
}
```

The following source code will be referred to as the file EmitServlet4.java. In this example, the following servlet acts as a communication link between the AppToServlet applet and the emGateway™ software on EMIT 4.0.

```java
// java imports
import java.io.*;
import javax.servlet.*;
import javax.servlet.http.*;

// emWare imports
import com.emWare.emClient.*;

public class EmitServlet4 extends HttpServlet
{
    // -----------------------------------------------------------------
    // ---- these properties are used by the JEmit object to connect to the emGateway ----
    // -----------------------------------------------------------------
            // the IP address or name of the emGateway host computer
            private String host_str = "10.1.1.28";
            // the emGateway HTTP port
            private int port_num = 80;
            // the device string
            private String device_str = "a=sdkboard";

// the username that the JEmit object is using to connect to emGateway
            private String username = "admin";
            // the password (associated with username) on the emGateway computer
            private String password = "admin";
    // -----------------------------------------------------------------
    // ----------------------------------------------------------------- private String
                mode,    // used to track the device mode value from the applet
                button,  // used to track the button push value from the applet
                green,   // used to track the green value from the applet
                red;     // used to track the red value from the applet /* flag if this servlet is connected to the emGateway:
```

```
                initialized to false so that we don't set
                the values in the applet until this servlet
                has successfully connected to the emGateway
        */
        private boolean connected = false;

EmitHandler emiHandler;    // thread that provides communication to the emGateway
        BoardModel theDeviceModel;  // provides a model for the values on the physical device
        DeviceSetter devSetter;     // provides a mechanism to set values on the physical device
        DeviceUpdated devUpdated;   // makes changes to the BoardModel object when the physical
device changes /* init() -------------------------------------
        Called by the servlet container to indicate
        that the servlet is being placed into service...
        initializes this servlet
        -------------------------------------------- */
        public void init(ServletConfig config) throws ServletException
        {
                // we must call super.init(config) when overriding this form of the method init()
                super.init(config);

// instantiate the BoardModel object
                theDeviceModel = new BoardModel();

/* instantiate and then initialize the DeviceSetter
                        object with the BoardModel object
                */
                devSetter = new DeviceSetter(theDeviceModel);
                theDeviceModel.setDevSetter(devSetter);

// instantiate the DeviceUpdated object with the BoardModel object
                devUpdated = new DeviceUpdated(theDeviceModel);

/* instantiate and then initialize the EmitHandler object
                        with the DeviceUpdated object and the BoardModel object
                */
                emiHandler = new EmitHandler(devUpdated, theDeviceModel);
                devSetter.setEmitHandler(emiHandler);

// cause the emiHandler thread to begin execution
                emiHandler.start();

// just a helpful system message
                System.out.println("EmitHandler thread is running...");
        }
```

```
/* doGet() -----------------------------------
called by the server (via the service method)
to allow the servlet to handle a GET request
------------------------------------------ */
public void doGet(HttpServletRequest req, HttpServletResponse res)
        throws ServletException, IOException
{
        /* only continue if the connected flag is true so that
                we don't set the values in the applet until this
                servlet has successfully connected to the emGateway...
                NOTE: the run() method of the AppToServlet applet
                        will continue to call on this servlet in
                                the ServletMonitor thread; so once the servlet
                                has successfully connected to the emGateway
                                the embedded device variables will be updated
        */
        if (connected)
        {
                /* set the content type of the response
                        being sent to the client as "text/html"
                        to prepare for obtaining a PrintWriter
                */
                res.setContentType("text/html");

// assign a PrintWriter object that can send character text to the client.
                PrintWriter out = res.getWriter();

/* assign String values to each of the embedded device variables from
                        the request parameters contained in the query string
                */
                String green  = (String) req.getParameter("green");
                String red    = (String) req.getParameter("red");
                String mode   = (String) req.getParameter("mode");
                String button = (String) req.getParameter("button");

/* if the green value does not equal -1 then call
                        the setGreenLed() function of the BoardModel object
                */
                if ( ! ( green.equals("-1") ) )
                {
                        theDeviceModel.setGreenLed(Integer.parseInt(green));
                }

/* if the red value does not equal -1 then call
                        the setRedLed() function of the BoardModel object
                */
                if ( ! ( red.equals("-1") ) )
```

```
            {
                    theDeviceModel.setRedLed(Integer.parseInt(red));
            }

/* if the mode value does not equal -1 then call
                    the setMode() function of the BoardModel object
            */
            if ( ! ( mode.equals("-1") ) )
            {
                    theDeviceModel.setMode(Integer.parseInt(mode));
            }

/* if the button value does not equal -1 then call
                    the setButton() function of the BoardModel object
            */
            if ( button != null && ( !(button.equals("-1")) ) )
            {
                    theDeviceModel.setButton(Integer.parseInt(button));
            }

/* print the servlet response output which will
                    be communciated back to the AppToServlet applet
            */
            out.print( "green="  + ( theDeviceModel.getGreenLed() ) );
            out.print( "&red="   + ( theDeviceModel.getRedLed() ) );
            out.print( "&mode="  + ( theDeviceModel.getMode() ) );
            out.println( "&button=" + ( theDeviceModel.getButton() ) );
    }
}

/* doPost() --------------------------------
called by the server (via the service method)
to allow a servlet to handle a POST request
------------------------------------------ */
public void doPost(HttpServletRequest req, HttpServletResponse res)
        throws ServletException, IOException
{
        // make a call to the doGet() method just incase a POST request was made instead
        doGet(req, res);
}
/* class EmitHandler -----------------------------
separate thread that establishes a connection
to the emGateway, acting as a communication link
between the AppToServlet applet and the emGateway
----------------------------------------------- */
class EmitHandler extends Thread implements EmbeddedListener
{
```

```
DeviceUpdated devUpdated;
BoardModel devModel;
JEmit emitObj;  // provides a mechanism to communicate with the physical device public EmitHandler(DeviceUpdated du, BoardModel dm)
{
        devUpdated = du;
        devModel = dm;

// just a helpful system message
        System.out.println("The EmitHandler is constructed...");
}

/* EmitHandler Member Function: run() ----------
 called when this thread is instantiated
------------------------------------------ */
public void run()
{
        // instantiate the JEmit object
        emitObj = new JEmit();

// just a helpful system message
        System.out.println("The JEmit was constructed......\n");

/* set the host field with the IP address
                  or name of the emGateway host computer
        */
        emitObj.setHost(host_str);

/* set the port field with
                  the emGateway HTTP port
        */
        emitObj.setPort(port_num);

/* set the device name
                  with the device string
        */
        emitObj.setDevice(device_str);

/* set the username field with the username that
                  the JEmit object is using to connect to emGateway
        */
        emitObj.setUsername(username);

/* set the password field with the password
                  (associated with username) on the emGateway computer
        */
```

```
emitObj.setPassword(password);

try
{
        /* connect to the remote device
                (using host, device, port, username,
                and password which were set above).
        */
        emitObj.connect();

// just a helpful system message
System.out.println("\nConnected to " + device_str + " on " + host_str + ":" + port_num);
}
catch(JEmitException e)
{
        System.out.println("could not connect... " + e);
}

// add this servlet to the JEmit object as an EmbeddedListener
emitObj.addEmbeddedListener(this);

try
{
        // subscribe to the embedded device variables in the JEmit object
        emitObj.subscribeVariable("Green");
        emitObj.subscribeVariable("Red");
        emitObj.subscribeVariable("Mode");
}
catch(JEmitException e)
{
        System.out.println("could not subscribe to variable" + e);
} try
{
        // forces all embedded device variables to report their current value
        emitObj.updateAllVariables();
}
catch(JEmitException e)
{
        System.out.println("could not update all variables... " + e);
}

// set the connected flag
if (emitObj.isConnected())
{
        connected = true;
```

```
                }
                else {
                        connected = false;
                }
        }

/* EmitHandler Member Function: destroy() ----------
        called by the servlet container to indicate
        to the servlet that it is being taken out
        of service and that it should destroy any
        resources that it has allocated
        ------------------------------------------------ */
        public void destroy()
        {
                try{Thread.sleep(1000);} catch(Exception e) {System.out.println("sleep:"+e);} try
                {
                        emitObj.disconnect();
                }
                catch(JEmitException e)
                {
                        System.out.println("there was a problem at disconnect... " + e);
                }

// just a helpful system message
System.out.println("\ndisconnected from " + device_str + " on " + host_str + ":" + port_num);
        }

/* EmitHandler Member Function: embeddedVariableChanged() -------
        processes embedded variable changes for this servlet
        ------------------------------------------------------------ */
        public void embeddedVariableChanged(EmbeddedEvent evt)
        {
                String name = evt.getName();
                Object value = evt.getValue();

/* if the embedded variable event name is "Green"
                        then call the updateGreenLed() method of the DeviceUpdated object
                */
                if( name.equals("Green") )
                {
                        int i = ((Short)value).intValue();
                        devUpdated.updateGreenLed(i);
                }

/* if the embedded variable event name is "Red"
```

```
                then call the updateRedLed() method of the DeviceUpdated object
        */
        else if( name.equals("Red") )
        {
                int i = ((Short)value).intValue();
                devUpdated.updateRedLed(i);
        }

/* if the embedded variable event name is "Mode"
                then call the updateMode() method of the DeviceUpdated object
        */
        else if( name.equals("Mode") )
        {
                int i = ((Short)value).intValue();
                devUpdated.updateMode(i);

/* if the event is a mode change to local mode then set
                        the red and green values of the BoardModel object
                */
        }
} public void embeddedEventSignaled(EmbeddedEvent evt)
{
        /* Not used... This method is only implemented
                because this object is an EmbeddedListener.
        */
} public void embeddedFunctionReturned(EmbeddedEvent evt)
{
        /* Not used... This method is only implemented
                because this object is an EmbeddedListener.
        */
}

/* EmitHandler Member Function: setGreenLed() ---------
set the green variable on the physical device
------------------------------------------------- */
public void setGreenLed(int i)
{
        try
        {
                emitObj.setVariable("Green", new Integer(i));
        }
        catch(JEmitException e)
        {
```

```
                System.out.println("there was a problem setting the Green variable on the device... " + e);
            }
    }

/* EmitHandler Member Function: setRedLed() ----------
            set the red variable on the physical device
            ------------------------------------------------ */
            public void setRedLed(int i)
            {
                    try
                    {
                            emitObj.setVariable("Red", new Integer(i));
                    }
                    catch(JEmitException e)
                    {
                System.out.println("there was a problem setting the Red variable on the device... " + e);
                    }
            }

/* EmitHandler Member Function: setMode() ------------
            set the mode variable on the physical device
            ------------------------------------------------ */
            public void setMode(int i)
            {
                    try
                    {
                            emitObj.invokeFunction("ChangeMode", new Integer(i));
                    }
                    catch(JEmitException e)
                    {
                System.out.println("there was a problem setting the Mode variable on the device... " + e);
                    }
            }

/* EmitHandler Member Function: setButton() ----------
            set the button variable on the physical device
            ------------------------------------------------ */
            public void setButton(int i)
            {
                    try
                    {
                            emitObj.setVariable("Button", new Integer(i));
                    }
                    catch(JEmitException e)
                    {
                System.out.println("there was a problem setting the Button variable on the device... " + e);
                    }
```

```
        }
}

/* class BoardModel --------------------------------
   provides a model for the values on the physical device
----------------------------------------------- */
class BoardModel
{
        public int
                greenLed=0,
                redLed=0,
                mode=3,
                button=0;

private DeviceSetter devSetter;

public void setDevSetter(DeviceSetter ds)
        {
                devSetter = ds;

// just a helpful system message
                System.out.println("The BoardModel is constructed...");
        }

/* each of the following four methods return each
                of the four variable values of this object
        */
        public int getGreenLed()
        {
                return greenLed;
        }
        public int getRedLed()
        {
                return redLed;
        }
        public int getMode()
        {
                return mode;
        }
        public int getButton()
        {
                return button;
        }

/* each of the following four methods sets each
                of the four variable values of this object
        */
```

```
        public void updatedGreenLed(int i)
        {
                greenLed = i;
        }
        public void updatedRedLed(int i)
        {
                redLed = i;
        }
        public void updatedMode(int i)
        {
                mode = i;
        }
        public void updatedButton(int i)
        {
                button = i;
        }

/* each of the following four methods sets each of the four
                embedded variable values of the DeviceSetter object
        */
        public void setGreenLed(int i)
        {
                devSetter.setGreenLed(i);
        }
        public void setRedLed(int i)
        {
                devSetter.setRedLed(i);
        }
        public void setMode(int i)
        {
                devSetter.setMode(i);
        }
        public void setButton(int i)
        {
                devSetter.setButton(i);
        }
}

/* class DeviceSetter --------------------------------
provides a mechanism to set values on the physical device
-------------------------------------------------- */
class DeviceSetter
{
        BoardModel theDeviceModel;
        EmitHandler theEmitHandler;

public DeviceSetter(BoardModel ds)
```

```java
        {
                theDeviceModel = ds;

// just a helpful system message
                System.out.println("The DeviceSetter is constructed...");
        } public void setEmitHandler(EmitHandler eh)
        {
                theEmitHandler = eh;
        }

/* each of the following four methods sets each of the four
                embedded variable values of the EmitHandler object
        */
        public void setGreenLed(int i)
        {
                theEmitHandler.setGreenLed(i);
        }
        public void setRedLed(int i)
        {
                theEmitHandler.setRedLed(i);
        }
        public void setMode(int i)
        {
                theEmitHandler.setMode(i);
        }
        public void setButton(int i)
        {
                theEmitHandler.setButton(i);
        }
}

/* class DeviceUpdated ------------------------------------------
   makes changes to the BoardModel object when the physical device changes
------------------------------------------------------------- */
class DeviceUpdated
{
        BoardModel theDeviceModel;

public DeviceUpdated(BoardModel ds)
        {
                theDeviceModel = ds;

// just a helpful system message
                System.out.println("The DeviceUpdated is constructed...");
        }
```

```
/* each of the following three methods sets the corresponding
        embedded variable values of the BoardModel object
*/
public void updateGreenLed(int i)
{
        theDeviceModel.updatedGreenLed(i);
}
public void updateRedLed(int i)
{
        theDeviceModel.updatedRedLed(i);
}
public void updateMode(int i)
{
        theDeviceModel.updatedMode(i);
}
public void updateButton(int i)
{
        theDeviceModel.updatedButton(i);
}
    }
}
```

The foregoing files may be used with the HTTP Tunneling example that demonstrates how to use a Java applet to communicate with a Java servlet, which in turn will communicate with the device on the emGateway™ software of EMIT 4.0. The applet AppToServlet communicates with the servlet EmitServlet4 via HTTP tunneling over Port 80, and the servlet acts as a communication link between the applet and the device on the emGateway™ software.

When EmitServlet4.java is compiled, five class files should be generated: EmitServlet4.class, BoardModel.class, DeviceSetter.class, DeviceUpdated.class and EmitHandler.class. The preceding five class files should then be manually copied into the servlet directory of the same web server from which the applet will be served. For example, if the Apache Web Server is being used along with Caucho's Resin Java Servlet Engine, and if the Apache Web Server was installed into its default location on a Windows 32-bit platform, then the above mentioned class files should be copied to the following directory:

C:\Program Files\Apache Group\Apache\htdocs\web-inf\classes\

The file emWarejar (available from emWare) should be copied from the default EMIT® 4.0 installation directory C:\emWare\VisualCafe Extras\bin\Components\ into the lib directory of the Java Servlet Engine. For example, if you are using version 1 .2.b1 of Caucho's Resin Java Servlet Engine, and if Resin was installed into its default location on a Windows 32-bit platform, then the above mentioned jar file should be copied to the following directory:

C:\resin1.2.b1\lib\

When AppToServletjava is compiled, seven class files should be generated: ButtonListener.class, DeviceSettings.class, GreenLedListener.class, ModeListener.class, RedLedListener.class, ServletMonitor.class and AppToServlet.class. It is recommended that the preceding seven class files be compressed within a jar file—along with the following sixteen emObject™ class files (available from emWare), which can be found within the EMIT® 4.0 directories, located under the emJava20 default installation directory: AlphaFilter.class, BrightnessFilter.class, emBarDisplay.class, EmbeddedVariableEvent.class, EmbeddedVariableListener.class, emBevelPanel.class, emKnob.class, emLabelObject.class, emLEDSwitch.class, emSwitch.class, emTransparentObject.class, emTransparentPanel.class, emType.class, emVariable.class, emVariableLabel.class and Imageutil.class. With all of the preceding twenty three class files included, the jar file should be rendered 55.4 KB in file size. The AppToServlet.class is served from the same web server on which EmitServlet4.class will run.

The HTTP tunneling example, from the applet's perspective, occurs as follows: (1) the AppToServlet.class is called by the browser or applet viewer, along with a parameter [servleturl], which is the URL to the EmitServlet4; (2) the method init( ) is automatically called by the browser or applet viewer to inform the applet that it has been loaded into the system; (3) the method init( ) initializes the applet by instantiating the DeviceSettings object, which represents the device status values, and then by instantiating the ServletMonitor object, which creates a thread that provides communication to the servlet; (4) when the ServletMonitor thread is started, its member function run( ) is called, the servlet URL is retrieved using getParameter( ), and as long as the applet continues to run, the thread continues to initiate communication with the servlet; (5) a URL object is instantiated with the servlet URL, along with a query string in which is encoded the values of the device variables as they are to be set from the applet (this is how the values are communicated to the servlet); (6) then a URLConnection( ) object is instantiated using the URL object, and the method openConnection( ) is then called on the URLConnection object, which actually initiates a connection to the servlet; (7) now that the connection has been made, a BufferedReader object is instantiated using the getInputStream( ) method of the URLConnection object; (8) a String object is then assigned the value returned by the readLine( ) method of the BufferedReader object (after which the BufferedReader stream is closed, the servlet has printed to the BufferedReader stream a string of characters used to transmit the values on the device, this is how the values are communicated back to the applet); (9) then the function serverStringParser( ) is called using the String object just assigned, which then parses the data received from the BufferedReader object in order to use this data to obtain the new values of the devices settings; (10) now, whenever any values are changed in the applet, those changes are recorded in the ServletMonitor object so that the next time the thread initiates a connection to the servlet those changes get recorded by the servlet (which will in turn communicate those changes to the emGateway).

The HTTP tunneling example, from the servlet's perspective, occurs as follows: (1) EmitServlet4.class is called by an applet call to the server along with a query string in which is encoded the values of the device variables as they were set in the applet; (2) the method init( ) is automatically called by the servlet container to indicate that the servlet is being placed into service; (3) the method init( ) initializes the servlet by instantiating the BoardModel object, which provides a model for the values on the physical device; (4) then the DeviceSetter object is instantiated, which provides a mechanism to set values on the physical device (the BoardModel object is required in order to instantiate the DeviceSetter object); (5) then the DeviceUpdated object is instantiated, which makes changes to the BoardModel object when the physical device changes (the DeviceSetter object is required in order to instantiate the DeviceUpdated object); (6) then the EmitHandler object is instantiated, which creates a separate thread that establishes a connection to the emGateway™ software, acting as a communication link between the applet and the emGateway™ software (DeviceUpdated object and the BoardModel object are both required in order to instantiate the EmitHandler object); (7) when the EmitHandler thread is started, its member function run( ) is automatically called; (8) the JEmit object is then instantiated; (9) the host field of the JEmit object is set with the IP address or name of the emGateway™ host computer; (10) the port field of the JEmit object is set with the emGateway™ HTTP port number; (11) the device name of the JEmit object is set with the device string; (12) the username field is set with the username that the Jemit object is using to connect to the emGateway™ computer; (13) the password field is set with the password (associated with username) on the emGateway™ computer; (14) then the JEmit object is connected to the emGateway™ computer; (15) the servlet is then added to the JEmit object as an EmbeddedListener, and the embedded device variables are subscribed to in the JEmit object; (16) now when one of the subscribed device variables is changed on the physical device, the EmitHandler member function embeddedVariableChanged( ) is called; (17) the function embeddedVariableChanged( ) determines what embedded event was fired, and then calls the appropriate update function from the DeviceUpdated object for the given event; (18) the given DeviceUpdated update function then calls the appropriate update function from the BoardModel object, which in turn sets the value of the given member variable of the BoardModel object—thus providing a representation of the values on the physical device. When the servlet needs to obtain access to the physical values on the device the values can be accessed from the BoardModel object (the reason for the round-about way of updating values in steps (9) and (10) is to modularize the process so that the variables and methods of the DeviceUpdated object and the BoardModel object may be accessed from varied instances); (19) each time the servlet is called, the doGet( ) method is initiated by the server (via the service method) in order to allow the servlet to handle a GET request, the doGet( ) method then parses the device values from the query string with the getParameter( ) method, and these values are then used to update theDeviceModel object (this is how the values are communicated from the applet); (20) finally, the doGet( ) method prints output to the servlet response, which provides a stream of characters back to the applet, the character stream is constructed using the values provided by the BoardModel object, thus communicating any changes made to the physical device (this is how the values are communicated back to the applet).

The HTTP Tunneling example may be used with the Apache Web Server along with Caucho's Resin Java Servlet Engine, on a Windows 32-bit platform. In current design, to install the Apache Web Server and the emGateway™ software on the same machine, they are configured for differ port numbers, as they currently cannot both share the same port. The HTTP Tunneling example assumes that the Apache Web Server has been configured on port 80 and that the emGateway™ software has been configured on port 81.

After the emGateway™ software, the Apache Web Server and the Resin Servlet Engine have been started, the example may be run. All Java servlet class files may be placed in the following directory:

C:\Program Files\Apache Group\Apache\htdocs\web-inf\classes\

Even though Apache and the Resin are installed into two completely different directories, access to the servlets will be made through the Apache Web Server.

The present invention may be embodied in other specific forms without departing from its spirit or essential characteristics. The described embodiments are to be considered in all The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system for facilitating communications with one or more embedded devices from a client application, said system comprising:
    gateway software running on a gateway computer, said gateway software including:
        device communications software, said device communications software comprising instructions for sending and receiving device messages to and from the one or more embedded devices; and
        gateway communications software, said gateway communications software comprising instructions for sending and receiving communications to other software;
    server software running on a server computer that is separate and distinct from the gateway computer, said server software including:
        user interface software, said user interface software being downloadable by the client application and being usable by the client application to communicate with said server software;
        serving software, said serving software responding to requests received from the client application through the user interface software;
        gateway communications software, said gateway communications software comprising instructions for sending and receiving communications to said gateway software;
    said system operating such that said server software communicates with said gateway software and said gateway software communicates with the one or more embedded devices, said server software operating to send a user interface component to the client application, the client application thereafter using the user interface component to communicate with an embedded device by sending communications to said server software, said server software facilitating communications with the embedded device through said gateway software, wherein the system is designed such that when a request is sent from the client application to the server computer, the server computer will determine whether the gateway or third party software is necessary to service the request.

2. The system as defined in claim 1 wherein the server software comprises a web server.

3. The system as defined in claim 2 wherein the user interface software comprises instructions written in HTML.

4. The system as defined in claim 2 wherein the user interface software comprises instructions written in HDML.

5. The system as defined in claim 2 wherein the user interface software comprises instructions written in WML.

6. The system as defined in claim 2 wherein the user interface software comprises a Java applet.

7. The system as defined in claim 6 wherein the serving software comprises a Java servlet.

8. A system for facilitating communications with one or more embedded devices from a client device, said system comprising:
    a gateway computer in electronic communication with the one or more embedded devices, said gateway computer running gateway software, said gateway software including:
        device communications software, said device communications software comprising instructions for sending send device messages to the one or more embedded devices and for receiving receive device messages from the one or more embedded devices; and
        gateway communications software, said gateway communications software comprising instructions for sending and receiving communications to other software;
    a server computer in electronic communication with said gateway computer, said server computer being in electronic communication with a computer network for communications with the client device, and said server computer running server software, said server software including:

user interface software, said user interface software being usable by the client device to communicate with said server software;

serving software, said serving software responding to requests received from the client device through the user interface software;

gateway communications software, said gateway communications software comprising instructions for sending and receiving communications to said gateway software;

said system operating such that said server computer communicates with said gateway computer and said gateway computer communicates with the one or more embedded devices, said server computer operating to send a user interface component to the client device, the client device thereafter using the user interface component to communicate with an embedded device by sending communications to said server computer, said server computer facilitating communications with the embedded device through said gateway computer, wherein the system is designed such that when a request is sent from the client application to the server computer, the server computer will determine whether the gateway or third party software is necessary to service the request.

9. The system as defined in claim 8 wherein the server software comprises a web server.

10. The system as defined in claim 9 wherein the user interface software comprises instructions written in HTML.

11. The system as defined in claim 9 wherein the user interface software comprises instructions written in HDML.

12. The system as defined in claim 9 wherein the user interface software comprises instructions written in WML.

13. The system as defined in claim 9 wherein the user interface software comprises a Java applet.

14. The system as defined in claim 9 wherein the serving software comprises a Java servlet.

15. A system for facilitating communications with one or more embedded devices from a client application, said system comprising:

a gateway computer in electronic communication with the one or more embedded devices, said gateway computer running gateway software, said gateway software including:

device communications software, said device communications software comprising instructions for sending send device messages to the one or more embedded devices and for receiving receive device messages from the one or more embedded devices; and gateway communications software, said gateway communications software comprising instructions for sending and receiving communications to other software;

a server computer running server software, said server software including:

user interface software, said user interface software being usable by the client application to communicate with said server software;

serving software, said serving software responding to requests received from the client application through the user interface software;

gateway communications software, said gateway communcations software comprising instructions for sending and receiving communications to said gateway software, said system operating such that said server software communicates with said gateway software and said gateway software communicates with the one or more embedded devices, said server software operating to send a user interface component to the client application, the client application thereafter using the user interface component to communicate with an embedded device by sending communications to said server software, said server software facilitating communications with the embedded device through said gateway software, wherein the system is designed such that when a request is sent from the client application to the server computer, the server computer will determine whether the gateway or third party software is necessary to service the request.

16. The system as defined in claim 15 wherein the server software comprises a web server.

17. The system as defined in claim 16 wherein the user interface software comprises instructions written in a markup language.

18. The system as defined in claim 16 wherein the user interface software comprises a Java applet.

19. The system as defined in claim 18 wherein the serving software comprises a Java servlet.

* * * * *

UNITED STATES PATENT AND TRADEMARK OFFICE
CERTIFICATE OF CORRECTION

PATENT NO.       : 7,117,268 B2  
APPLICATION NO.  : 09/727244  
DATED            : October 3, 2006  
INVENTOR(S)      : Jesse L. Parent It is certified that error appears in the above-identified patent and that said Letters Patent is hereby corrected as shown below:

Column 7, line 61, "em Ware" should be --emWare--.  
Column 7, line 66, "em Ware" should be --emWare--.  
Column 11, line 13, "em Ware" should be --emWare--.  
Column 11, line 14, "em Ware's" should be --emWare's--.  
Column 12, line 18, "em Ware®" should be --emWare®--.  
Column 12, line 33,'THe" should be --The--.  
Column 94, line 54, "usemame" should be --username--.  
Column 98, lines 20-21, "commumcations" should be --communications--.

Signed and Sealed this

Tenth Day of April, 2007

JON W. DUDAS  
*Director of the United States Patent and Trademark Office*